(12) United States Patent
Meisel et al.

(10) Patent No.: US 7,702,537 B2
(45) Date of Patent: *Apr. 20, 2010

(54) SYSTEM AND METHOD FOR ENABLING MULTI-ELEMENT BIDDING FOR INFLUENCING A POSITION ON A SEARCH RESULT LIST GENERATED BY A COMPUTER NETWORK SEARCH ENGINE

(75) Inventors: Ted Meisel, Los Angeles, CA (US); Peter Savich, Seattle, WA (US); Thomas A. Soulanille, Pasadena, CA (US)

(73) Assignee: Yahoo! Inc, Sunnyvale, CA (US)

( * ) Notice: Subject to any disclaimer, the term of this patent is extended or adjusted under 35 U.S.C. 154(b) by 1031 days.

This patent is subject to a terminal disclaimer.

(21) Appl. No.: 11/409,786

(22) Filed: Apr. 24, 2006

(65) Prior Publication Data

US 2006/0190354 A1    Aug. 24, 2006

Related U.S. Application Data

(63) Continuation of application No. 10/061,388, filed on Feb. 1, 2002, now Pat. No. 7,035,812, which is a continuation-in-part of application No. 09/918,241, filed on Jul. 30, 2001, now Pat. No. 6,983,272, which is a continuation of application No. 09/322,677, filed on May 28, 1999, now Pat. No. 6,269,361.

(51) Int. Cl.
  *G06Q 30/00* (2006.01)
(52) U.S. Cl. ............... 705/14.54; 705/14.51; 705/14.52
(58) Field of Classification Search ............ 705/14, 705/37, 14.41, 14.46, 14.51, 14.52, 14.53, 705/14.54
See application file for complete search history.

(56) References Cited

U.S. PATENT DOCUMENTS 5,659,732 A    8/1997    Kirsch (Continued)

FOREIGN PATENT DOCUMENTS

WO    WO 97/22066    6/1997

(Continued)

OTHER PUBLICATIONS

Direct Hit, Wire 2000 Corporation, dated Oct. 19, 2000, available online at http://web.archive.org/web/20001019055941, 3 pages.
Lee Sherman et al., Banner Advertising: Measuring Effectiveness and Optimizing Placement, Journal of Interactive Marketing, vol. 15, No. 2, Spring 2001, 5 pages.

(Continued)

*Primary Examiner*—Nicholas D Rosen
(74) *Attorney, Agent, or Firm*—Brinks Hofer Gilson & Lione

(57) ABSTRACT

A system and method for enabling information providers using a computer network to influence a position for a search listing within a search result list generated by an Internet search engine. A database stores accounts for the network information providers. Each account contains at least one search listing having a description, a search term of keywords, and a bid amount. The network information provider may add, delete, or modify a search listing after authenticated login. A bidding process occurs when the network information provider enters a new bid amount for a search listing. The system and method compares the bid amount with all other bid amounts for the same search term, and generates a rank value for all search listings having that search term. The rank value determines where the listing will appear on the search results list page generated in response to a query of the search term.

6 Claims, 9 Drawing Sheets

U.S. PATENT DOCUMENTS

| | | | |
|---|---|---|---|
| 5,717,923 | A | 2/1998 | Dedrick |
| 5,724,424 | A | 3/1998 | Gifford |
| 5,724,521 | A | 3/1998 | Dedrick |
| 5,724,524 | A | 3/1998 | Hunt et al. |
| 5,748,954 | A | 5/1998 | Mauldin |
| 5,752,238 | A | 5/1998 | Dedrick |
| 5,768,521 | A | 6/1998 | Dedrick |
| 5,778,367 | A | 7/1998 | Wesinger et al. |
| 5,794,210 | A | 8/1998 | Goldhaber et al. |
| 5,826,241 | A | 10/1998 | Stein et al. |
| 5,848,397 | A | 12/1998 | Marsh et al. |
| 5,848,407 | A | 12/1998 | Ishikawa et al. |
| 5,852,820 | A | 12/1998 | Burrows |
| 5,855,008 | A | 12/1998 | Goldhaber et al. |
| 5,862,223 | A | 1/1999 | Walker et al. |
| 5,864,845 | A | 1/1999 | Voorhees et al. |
| 5,864,846 | A | 1/1999 | Voorhees et al. |
| 5,903,882 | A | 5/1999 | Asay et al. |
| 5,918,014 | A | 6/1999 | Robinson |
| 5,920,854 | A | 7/1999 | Kirsch et al. |
| 5,920,859 | A | 7/1999 | Li |
| 6,078,866 | A | 6/2000 | Buck et al. |
| 6,205,432 | B1 | 3/2001 | Gabbard et al. |
| 6,249,773 | B1 | 6/2001 | Allard et al. |
| 6,253,188 | B1 | 6/2001 | Witek et al. |
| 6,269,361 | B1 | 7/2001 | Davis et al. |
| 6,285,987 | B1 | 9/2001 | Roth et al. |
| 6,379,251 | B1 | 4/2002 | Auxier et al. |
| 6,421,675 | B1 | 7/2002 | Ryan et al. |
| 6,535,881 | B1 * | 3/2003 | Baclawski ......................... 1/1 |
| 6,654,725 | B1 | 11/2003 | Langheinrich et al. |
| 6,763,334 | B1 | 7/2004 | Matsumoto et al. |
| 6,907,566 | B1 | 6/2005 | McElfresh et al. |
| 6,983,272 | B2 | 1/2006 | Davis, et al. |
| 7,035,812 | B2 | 4/2006 | Meisel et al. |
| 7,100,111 | B2 | 8/2006 | McElfresh et al. |
| 2002/0004735 | A1 | 1/2002 | Gross |
| 2003/0014331 | A1 | 1/2003 | Simons et al. |
| 2003/0149938 | A1 | 8/2003 | McElfresh et al. |
| 2004/0088241 | A1 | 5/2004 | Rebane et al. |
| 2007/0100757 | A1 * | 5/2007 | Rhoads ........................ 705/51 |

FOREIGN PATENT DOCUMENTS

| | | |
|---|---|---|
| WO | WO 99/48028 | 9/1999 |
| WO | WO 00/16218 | 3/2000 |
| WO | WO 00/41090 | 7/2000 |
| WO | WO 01/35714 | 5/2001 |

OTHER PUBLICATIONS

Examination report issued in counterpart European application No. 02 255 464.6, dated Oct. 8, 2008, 4 pages.

Examination report issued in counterpart Canadian application No. 2,396,394, Dec. 12, 2006, 17 pages.

Examination report issued in counterpart Canadian application No. 2,396,394, Jun. 4, 2008, 4 pages.

English translation of examination report issued in counterpart German application No. 102 35 804.4, Mar. 13, 2007, 9 pages.

Examination report issued in counterpart Japanese application No. 2002-260582, Feb. 20, 2006, with English translation, 4 pages.

Examination report issued in counterpart Japanese application No. 2002-260582, Sep. 28, 2006, with English translation, 4 pages.

Examination report issued in counterpart Japanese application No. 2002-260582, Jul. 17, 2007, with English translation, 3 pages.

Friedman, D.D., Price Theory, Second Edition, South-Western Publishing Co., Cincinnati, 1990, pp. 380-383.

Anon., "Compaq's AltaVista to Sell Key Slots in Web Search Results," Houston Chronicle, Apr. 16, 1999.

Anon., "Findwhat.com Anticipates Fourth Quarter Search Engine Revenue to Double Versus Q3 2000—FindWaht.com's Cost Per Click Model Continues to Gain Momentum While Impression-Based Online Advertising Models Weaken," Business Wire, Jan. 9, 2001.

Press Release article titled "GoTo.com Announces First round of Financing, Totaling More Than $6 Million, Led by Draper, Fisher Jurvetson", Business Wire, dated May 19, 1998, 2 pages.

Anonymous Letter to John Rauch, dated Sep. 10, 2007, 1 pg.

* cited by examiner

SYSTEM AND METHOD FOR ENABLING MULTI-ELEMENT BIDDING FOR INFLUENCING A POSITION ON A SEARCH RESULT LIST GENERATED BY A COMPUTER NETWORK SEARCH ENGINE

CROSS REFERENCE TO RELATED APPLICATION

This application is a continuation of U.S. application Ser. No. 10/061,388 filed Feb. 1, 2002, issued as U.S. Pat. No. 7,035,812 on Apr. 25, 2006, which is a continuation in part of application Ser. No. 09/918,241, filed Jul. 30, 2001, now U.S. Pat. No. 6,983,272, which is a continuation of application Ser. No. 09/322,677, filed May 28, 1999, now U.S. Pat. No. 6,269,361, all of which applications are incorporated herein in their entirety by this reference.

BACKGROUND

The transfer of information over computer networks has become an increasingly important means by which institutions, corporations, and individuals do business. Computer networks have grown over the years from independent and isolated entities established to serve the needs of a single group into vast internets which interconnect disparate physical networks and allow them to function as a coordinated system. Currently, the largest computer network in existence is the Internet. The Internet is a worldwide interconnection of computer networks that communicate using a common protocol. Millions of computers, from low end personal computers to high end super computers, are connected to the Internet.

The Internet has emerged as a large community of electronically connected users located around the world who readily and regularly exchange significant amounts of information. The Internet continues to serve its original purposes of providing for access to and exchange of information among government agencies, laboratories, and universities for research and education. In addition, the Internet has evolved to serve a variety of interests and forums that extend beyond its original goals. In particular, the Internet is rapidly transforming into a global electronic marketplace of goods and services as well as of ideas and information.

This transformation of the Internet into a global marketplace was driven in large part by the introduction of an information system known as the World Wide Web ("the web"). The web is a unique distributed database designed to give wide access to a large universe of documents. The database records of the web are in the form of documents known as "pages". These pages reside on web servers and are accessible via the Internet. The web is therefore a vast database of information dispersed across countless individual computer systems that is constantly changing and has no recognizable organization or morphology. Computers connected to the Internet may access the web pages via a program known as a browser, which has a powerful, simple-to-learn graphical user interface. One powerful technique supported by the web browser is known as hyperlinking, which permits web page authors to create links to other web pages which users can then retrieve by using simple point-and-click commands on the web browser.

The pages may be constructed in any one of a variety of formatting conventions, such as Hyper Text Markup Language (HTML), and may include multimedia information content such as graphics, audio, and moving pictures. Any person with a computer and a connection to the Internet may access any publicly accessible page posted on the web. Thus, a presence on the World Wide Web has the capability to introduce a worldwide base of consumers to businesses, individuals, and institutions seeking to advertise their products and services to potential customers. Furthermore, the ever increasing sophistication in the design of web pages, made possible by the exponential increase in data transmission rates and computer processing speeds, makes the web an increasingly attractive medium for advertising and other business purposes, as well as for the free flow of information.

The availability of powerful new tools that facilitate the development and distribution of Internet content has led to a proliferation of information, products, and services offered on the Internet and dramatic growth in the number of consumers using the Internet. International Data Corporation, commonly referred to as IDC, estimates that the number of Internet users will grow from approximately 97 million worldwide in 1998 to approximately 320 million worldwide by the end of 2002. In addition, commerce conducted over the Internet has grown and is expected to grow dramatically. IDC estimates that the percentage of Internet users buying goods and services on the Internet will increase from approximately 28% at the end of 1998 to approximately 40% in 2002, and that over the same period of time, the total value of goods and services purchased over the Internet will increase from approximately $32.4 billion to approximately $425.7 billion.

The Internet has emerged as an attractive new medium for businesses and advertisers of information, products and services to reach these large numbers of consumers. However, the web is composed of a seemingly limitless number of web pages dispersed across millions of different computer systems all over the world in no discernible organization. Search services or mechanisms, such as directories and search engines, have been developed to index and search the information available on the web and thereby help Internet users locate information of interest. These search services enable consumers to search the Internet for a listing of web sites based on a specific topic, product, or service of interest.

Search services are, after e-mail, the most frequently used tool on the Internet. As a result, web sites providing search services offer advertisers significant reach into the Internet audience and give advertisers the opportunity to target consumer interests based on keyword or topical search requests. Businesses and advertisers have an interest in participating in search result listings. In doing so, they generally seek to maximize exposure and traffic to their web sites, while managing any costs associated with such exposure in an efficient and cost-effective manner.

Generally, in a web-based search on an Internet search engine, a user enters a search term comprising one or more keywords, which the search engine then uses to generate a listing of web pages that the user may access via a hyperlink. There are many ways in which a search engine can return the results listings. There are search engines that use automated search technology, which relies in large part on complex, mathematics-based database search algorithms that select and rank web pages based on multiple criteria such as keyword density and keyword location. The search results generated by such mechanisms often rely on blind mathematical formulas and may be random and even irrelevant. These search engines often catalog search results that rely on invisible web site descriptions, or "meta tags", that are authored by web site promoters. It is not uncommon for web site owners to tag their sites as they choose in attempt to attract additional consumer attention at little to no marginal cost.

Other search engines and web site directories may also rely on manual efforts of limited editorial staffs to review web page information, which becomes an ever-increasing difficult task as the volume and diversity of Internet content grows. No matter what the process, however, web page owners seek to target more effectively their web exposure and distribute information to the attention of interested users on a current and comprehensive basis, while maintaining costs or monitoring budgets.

One known effort that has been used by advertisers to generate web site traffic is banner advertising, where web site promoters seeking to promote and increase their web exposure purchase space on the pages of popular commercial web sites. The web site promoters usually fill this space with a colorful graphic, known as a banner, advertising their own web site and acting as a hyperlink for a visitor to click on to access the site. Banners may be displayed at every page access or may be targeted to search terms used on a search engine. Like traditional advertising, banner advertising on the Internet is typically priced only on an impression basis, with advertisers paying for exposures to potential consumers. Using only this type of advertising, however, may not necessarily provide the most desirable or cost efficient exposure rate for a business or advertiser seeking to target interested consumers.

Internet advertising can offer a level of targetability, interactivity, and measurability not generally available in other media. With the proper tools, Internet advertisers have the ability to direct and target their messages to specific groups of consumers and receive prompt feedback as to the effectiveness of their advertising campaigns. Many of the traditional paradigms of advertising and search engine algorithms fail to offer appropriate options to businesses or advertisers or to maximize the delivery of relevant information via the web to interested parties in a cost-effective manner for those businesses and advertisers. Ideally, web site promoters or advertisers should be able to control their placement in search result listings so that their listings appear in searches that are relevant to the content of their web site and to control their mode of participation and any associated costs so that such listings are desirable or effective for their business. Search engine functionality needs to facilitate an on-line marketplace which offers consumers quick, easy and relevant search results while providing Internet advertisers and promoters with a cost-effective way to target consumers in a manner they determine most appropriate for their business goals. In this on-line marketplace, companies selling products, services, or information will be able to determine the options that best suit its advertising and cost needs and appear in desirable positions on a search result list generated by an Internet search engine.

Since advertisers generally must pay for each referral generated through the search result lists generated by the search engine, advertisers have an incentive to select and bid on those search keywords that are most relevant to their web site offerings. A referral can be of any one of a number types. One type of referral is an impression referral, whereby the advertiser's listing appears in the search results list. Another type of referral is a click-through referral, whereby a consumer clicks on the advertiser's listing. Still another type of referral is an action referral, whereby after the consumer has clicked on the advertiser's listing, the consumer takes further action in connection with the advertiser's web site. These further actions include, for example, actions such as registering with the advertiser's site, participating in a promotion in connection with the advertiser's site, and/or purchasing a good or service from the advertiser. Advertisers can bid on one or more of the various types of referrals. In the case where the advertiser bids on more than one type of referral, a bid will comprise multiple elements, one element per type of referral bid upon. The higher the market value of an advertiser's bid, the higher the advertiser's position on a search result list. The higher an advertiser's position on a search result list, the higher the likelihood of a referral; that is, the higher the likelihood that a consumer will be referred to the advertiser's web site through the search result list.

It is therefore an object of the present invention to provide a system and method for enabling promoters to influence a position on a search result listing generated by an Internet search engine for a specified set of search terms.

It is also an object of the present invention to provide promoters with a search engine that permits such promoters to influence a higher placement in a search result list via a continuous, competitive online bidding process.

It is another object of the present invention to provide a cost-effective method of Internet advertising where the web site promoter is charged in direct proportion to the number of referrals generated by the search engine.

It is another object of the present invention to create a new method of advertising where advertisers can bid on those types of referrals that the advertiser wants to bid upon, and where the market value of that bid determines the advertiser's search results list placement A further object being that advertisers are allowed to select and modify referrals to better meet their business needs.

BRIEF SUMMARY

The present embodiments seek to address the aforementioned problems by providing a system and method for enabling a web site promoter using a computer network to influence a position within a search result list generated by an Internet search engine. One embodiment relates to a system and method to enable a web site promoter to define a search listing for a search result list, select a search term relevant to the promoter's web site, and influence a search result list position for the search listing on an Internet search engine. When an Internet user enters the search terms in a search engine query, the search engine will generate a search result list with the web site promoter's listing in a position influenced by one or more parameters defined by the promoter. The present embodiments further permit web site promoters to select the types of referrals to utilize when selecting search terms for purposes of participating in the search result listings.

The embodiments described herein use the concept of a bid, which corresponds to the economic value that an advertiser will give when network locations associated with the advertiser are referred to a searcher in response to a query from the searcher. The economic value may be a money amount charged or chargeable to the advertiser, either directly or indirectly. The economic value may be an amount debited from an account of the advertiser. The amount may be a money amount or another value, such as credit points. The economic value may be given by the advertiser to the operator of a database search system or to a third party.

The economic value is given when a searcher is referred to one or more network locations, such as advertiser web sites, are referred to a searcher. The referral may be made by presenting the network locations on a screen used for data entry and receipt by the searcher, alone or with other search results. This is referred to as an impression. Alternatively, and in an embodiment generally described herein, the referral may occur when the searcher clicks on or clicks through to access the network locations of the advertiser, as will be described in greater detail below. Or the referral may be by some other action taken by the searcher after accessing the network locations of the advertiser.

In one embodiment, a web site promoter selects a search term and influences a position within the search result list generated by that search term by participating in an online competitive bidding process. This online competitive bidding process allows a web site promoter to pay for selected referrals and may be employed in conjunction with an Internet search engine. Allowing promoters to pay for selected referrals applies market principles to advertising on the Internet. Conventional Internet search engines do not provide a way for web site promoters to easily predict the position of their web site in search results or guarantee their appearance in search results containing their web site description. A tool enabling advertisers to target web search terms relevant to their business and to influence the placement of their web site description within the search results provides a powerful advantage to businesses and others seeking to increase their web exposure. Furthermore, a competitive pricing or bidding process and basing pricing on type and number of web site referrals generated helps ensure that the pricing structure reflects the market and is accessible to advertisers of all budget sizes.

To participate in the process, an advertiser or web site promoter may access the advertiser's user account through a secure web site. The advertiser may use the account to place bids on search terms that are relevant to the advertiser's web site. Each bid relates to a search term-web site combination and corresponds to money amounts that the advertiser will pay to the owner of the search engine each time a searcher is referred to the advertiser through the search result list generated by the search engine. These money amounts apply to one or more of the types of referrals, which include impression, click-through, or action. The appearance of the advertiser's listing in the search results list will result in an impression referral. A click-through referral will occur when a searcher clicks on the advertiser's listing, and this click will result in an access request being sent to the advertiser's web site, which will respond by transmitting the advertiser's web page to the searcher's browser. An action referral will occur when, after the search is performed, the searcher performs a further action in connection with the advertiser's web page, including, for example, actions such as registering with the advertiser's site, participating in a promotion in connection with the advertiser's site, or purchasing a good or service from the advertiser. In general, click-through referrals provide higher benefits to the advertiser than impression referrals, action referrals provide higher benefits than click-through referrals, and some types of action referrals provide higher benefits than other types of actions. Nonetheless, all types of referrals provide benefits to the advertiser. Since the charge to the advertiser is based on the number and type of referrals to the advertiser's web site that were generated by the search engine, the charge for placement is directly proportional to the benefits received.

The higher the market value of the bid, the more advantageous the placement in the search result list that is generated when the bidded search term is entered by a searcher using the search engine. The search result list is arranged in order of decreasing bid value, with the search listing corresponding to the highest valued bids displayed first to the searcher. Preferably, each search listing corresponding to a bid is identified on the display as a paid listing. Most preferably, the bid value is included on the identification. In addition, the search result list of the present embodiments is preferably combined with "non-paid" web site descriptions generated by a conventional Internet search engine, preferably including listings generated according to mathematics-based database search algorithms as discussed above. The combination of paid and unpaid listings helps ensure that the searcher will receive the most complete and relevant search results. Most preferably, the non-paid listings are considered to have a bid value of zero and are therefore underneath the paid results.

According to a first embodiment, there is provided a system and method for enabling the web site promoters to influence a position for a search listing within a search result list generated by an Internet search engine. The advertiser or web site promoter first selects a search term comprising one or more keywords relevant to the content of the web site to be listed. The advertiser or web site promoter influences the rank position for the search listing through an ongoing online competitive bidding process with other web site promoters. The bidding process occurs when an advertiser enters a new set of bid element amounts for an existing search listing or enters a set of bid element amounts for a new search listing. Preferably, the advertiser or promoter's bid is then processed in real time. The value of this set of bid element amounts is compared with the values of all other bids from other promoters for the same search term, and generates new rank values for all search listings having that search term. The rank value determines the position where the promoter's web site description will appear on the search results list page that is generated when the search term is entered into the query box on the search engine by a searcher. A more valuable bid will result in a higher rank value and a more advantageous placement, which is preferably near the beginning of the search results list page. Preferably, the quantities used in the competitive bidding process are money amounts that the web site promoter will pay to an owner of the Internet search engine each time the advertiser's web site is referred by the search engine in the ways that the advertiser has bid upon. Most preferably, these money amounts will be deducted from an account balance that is retained in the promoter's account for each time the promoter's web site is referred by the search engine.

One embodiment of the system and method provides a database having accounts for the web site promoters. Each account includes contact and billing information for a web site promoter. In addition, each account includes at least one search listing, each search listing having five components: a description of the web site to be listed, the Uniform Resource Locator (URL) of the web site, a search term comprising one or more keywords, a set of bid element amounts, and a title for the search listing. Each account may also include the promoter's payment history and a history of search listings entered by the user. The promoter logs in to his or her account via an authentication process running on a secure server. Once logged in, the promoter may add, delete, or modify a search listing and modify its bid element amounts. The functions of adding or deleting a search listing, or modifying the bid element amounts of a search listing is to initiate the competitive bidding process described above. All search listing changes and modifications are processed substantially in real time to support the online competitive bidding process.

One embodiment provides a method of determining the market value of a bid. A bid is comprised of a set of bid element amounts. Each element of the bid is associated with one type of referral. The market value of a bid is calculated as the sum of the market values of the elements of that bid. The market value of a bid element is calculated as the product of the amount of the bid element and the probability of the occurrence of the referral associated with that element.

In an alternative embodiment of the system and method of the present invention, the system, instead of the web site promoter, selects the search term or terms relevant to the promoter's web site. This saves the promoter from doing this work, although it leaves the promoter with less control.

DETAILED DESCRIPTION OF THE PRESENTLY PREFERRED EMBODIMENTS

Methods and systems for generating a pay-for-placement search result determined by a site promoter, such as an advertiser, over a client/server based computer network system are disclosed. The following description is presented to enable any person skilled in the art to make and use the invention. For purposes of explanation, specific nomenclature is set forth to provide a thorough understanding of the present invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
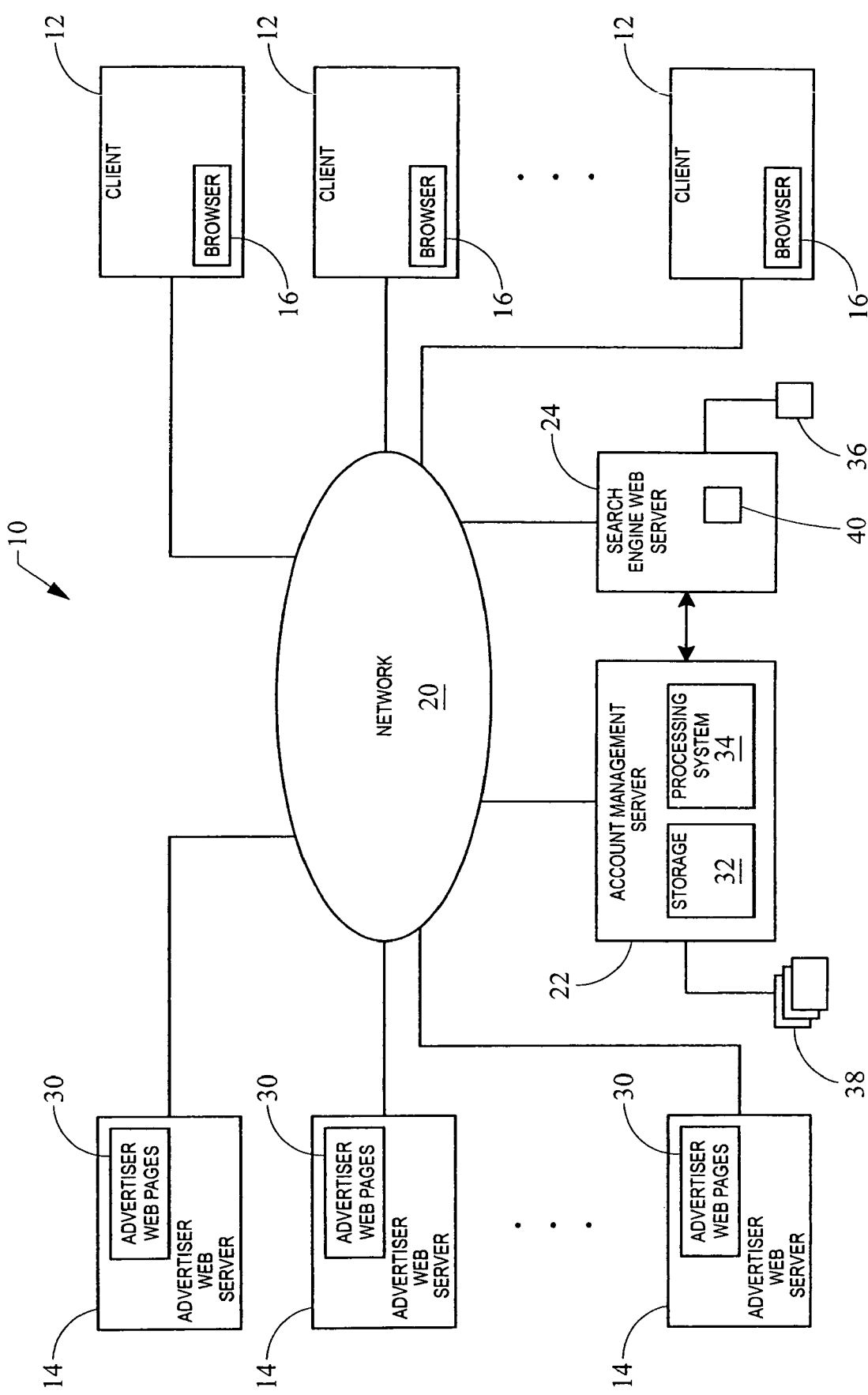
FIG. 1 is a block diagram illustrating the relationship between a large network and one embodiment of the system and method for generating a pay-for-performance search result of the present invention.

Referring now to the drawings, FIG. 1 is an example of a distributed system 10 configured as client/server architecture used in a first embodiment. A "client" is a member of a class or group that uses the services of another class or group to which it is not related. In the context of a computer network, such as the Internet, a client is a process (i.e. roughly a program or task) that requests a service which is provided by another process, known as a server program. The client process uses the requested service without having to know any working details about the other server program or the server itself. In networked systems, a client process usually runs on a computer that accesses shared network resources provided by another computer running a corresponding server process. However, it should also be noted that it is possible for the client process and the server process to run on the same computer.

A "server" is typically a remote computer system that is accessible over a communications medium such as the Internet. The client process may be active in a second computer system, and communicate with the server process over a communications medium that allows multiple clients to take advantage of the information-gathering capabilities of the server. Thus, the server essentially acts as an information provider for a computer network.

The block diagram of FIG. 1 therefore shows a distributed system 10 comprising a plurality of client computers 12, a plurality of advertiser web servers 14, an account management server 22, and a search engine web server 24, all of which are connected to a network 20. The network 20 will be hereinafter generally referred to as the Internet. Although the disclosed system and method are specifically useful for the Internet, it should be understood that the client computers 12, advertiser web servers 14, account management server 22, and search engine web server 24 may be connected together through one of a number of different types of networks. Such networks may include local area networks (LANs), other wide area networks (WANs), and regional networks accessed over telephone lines, such as commercial information services. The client and server processes may even comprise different programs executing simultaneously on a single computer.

The client computers 12 can be conventional personal computers (PCs), workstations, or computer systems of any other size. Each client 12 typically includes one or more processors, memories, input/output devices, and a network interface, such as a conventional modem. The advertiser web servers 14, account management server 22, and the search engine web server 24 can be similarly configured. However, advertiser web servers 14, account management server 22, and search engine web server 24 may each include many computers connected by a separate private network. In fact, the network 20 may include hundreds of thousands of individual networks of computers.

The client computers 12 can execute web browser programs 16, such as the NAVIGATOR, EXPLORER, or MOSAIC browser programs, to locate the web pages or records 30 stored on advertiser server 14. The browser programs 16 allow the users to enter addresses of specific web pages 30 to be retrieved. These addresses are referred to as Uniform Resource Locators, or URLs. In addition, once a page has been retrieved, the browser programs 16 can provide access to other pages or records when the user "clicks" on hyperlinks to other web pages. Such hyperlinks are located within the web pages 30 and provide an automated way for the user to enter the URL of another page and to retrieve that page. The pages can be data records including as content plain textual information, or more complex digitally encoded multimedia content, such as software programs, graphics, audio signals, videos, and so forth.

In one embodiment, illustrated in FIG. 1, client computers 12 communicate through the network 20 with various network information providers, including account management server 22, search engine server 24, and advertiser servers 14 using the functionality provided by a HyperText Transfer Protocol (HTTP), although other communications protocols, such as FTP, SNMP, TELNET, and a number of other protocols known in the art, may be used. Preferably, search engine server 24, account management server 22, and advertiser servers 14 are located on the World Wide Web.

As discussed above, at least two types of server are contemplated in a preferred embodiment. The first server contemplated is an account management server 22 comprising a computer storage medium 32 and a processing system 34. A database 38 is stored on the storage medium 32 of the account management server 22. The database 38 contains advertiser account information. It will be appreciated from the description below that the illustrated system and method may be implemented in software that is stored as executable instructions on a computer storage medium, such as memories or mass storage devices, on the account management server 22. Conventional browser programs 16, running on client computers 12, may be used to access advertiser account information stored on account management server 22. Preferably, access to the account management server 22 is accomplished through a firewall, not shown, which protects the account management and search result placement programs and the account information from external tampering. Additional security may be provided via enhancements to the standard communications protocols such as Secure HTTP or the Secure Sockets Layer.

The second server type contemplated is a search engine web server 24. A search engine program permits network users, upon navigating to the search engine web server URL or sites on other web servers capable of submitting queries to the search engine web server 24 through their browser program 16, to type keyword queries to identify pages of interest among the millions of pages available on the World Wide Web. In one embodiment, the search engine web server 24 generates a search result list that includes, at least in part, relevant entries obtained from and formatted by the results of the bidding process conducted by the account management server 22. The search engine web server 24 generates a list of hypertext links to documents that contain information relevant to search terms entered by the user or by the system at the client computer 12. The search engine web server transmits this list, in the form of a web page, to the network user, where it is displayed on the browser 16 running on the client computer 12. A presently preferred embodiment of the search engine web server may be found by navigating to the web page at URL http://www.overture.com/. In addition, the search result list web page, an example of which is presented in FIG. 7, will be discussed below in further detail.

Search engine web server 24 is connected to the Internet 20. In one embodiment, search engine web server 24 includes a search database 40 comprised of search listing records used to generate search results in response to user queries. In addition, search engine web server 24 may also be connected to the account management server 22. Account management server 22 may also be connected to the Internet. The search engine web server 24 and the account management server 22 address the different information needs of the users located at client computers 12.

For example, one class of users located at client computers 12 may be network information providers such as advertising web site promoters or owners having advertiser web pages 30 located on advertiser web servers 14. These advertising web site promoters, or advertisers, may wish to access account information residing in storage 32 on account management server 22. An advertising web site promoter may, through the account residing on the account management server 22, participate in a competitive bidding process with other advertisers. An advertiser may bid on any number of search terms relevant to the content of the advertiser's web site. In one embodiment, the relevance of a bidded search term to an advertiser's web site is determined through a manual editorial process prior to insertion of the search listing containing the search term and advertiser web site URL into the database 40. In an alternate embodiment, the relevance of a bidded search term in a search listing to the corresponding web site may be evaluated using a computer program executing at processor 34 of account management server 22, where the computer program will evaluate the search term and corresponding web site according to a set of predefined editorial rules. In another embodiment, the system, rather than the advertiser, selects the search term or terms relevant to the content of the advertiser's site.

The more valuable bids receive more advantageous placement on the search result list page generated by the search engine 24 when a search using the search term bid on by the advertiser, or associated by the system with the advertiser's web site, is executed. In one embodiment, the bid by an advertiser comprises a money amount that is deducted from the account of the advertiser for each time a specific type of referral to that advertiser occurs. Preferentially, that specific type of referral is the click-through referral. Click-through referrals are preferable to impression referrals in that advertisers generally prefer the former over the latter. Moreover, click-through referrals are preferred to action referrals in that recording the former is within the exclusive control of the search engine web server 24, whereas recording the latter requires cooperation of the advertiser, since actions generally occur on the advertiser's web site. In this embodiment, bids comprise only one element—specifically, the money amount that is deducted upon the occurrence of a click-through referral. A click-through referral occurs when the advertiser's web site is accessed via a hyperlink on the search result list page. A searcher "clicks" on the hyperlink with a computer input device to initiate a retrieval request to retrieve the information associated with the advertiser's hyperlink. Preferably, each access or "click" on a search result list hyperlink will be redirected to the search engine web server 24 to associate the "click" with the account identifier for an advertiser. This redirect action, which is not apparent to the searcher, will access account identification information coded into the search result page before accessing the advertiser's URL using the search result list hyperlink clicked on by the searcher. The account identification information is recorded in the advertiser's account along with information from the retrieval request as a retrieval request event. Since the information obtained through this mechanism conclusively matches an account identifier with a URL in a manner not possible using conventional server system logs known in the art, accurate account debit records will be maintained. Most preferably, the advertiser's web site description and hyperlink on the search result list page is accompanied by an indication that the advertiser's listing is a paid listing. Most preferably, each paid listing displays a "cost to advertiser," which is an amount corresponding to value of the advertiser's bid for each click-through referral to the advertiser's site through the search result list.

In a second embodiment, the bid by an advertiser comprises a set of money amounts that are deducted from the account of the advertiser for each time certain types of referrals to that advertiser occur. Preferentially, the types of referrals available to the advertiser to be bid upon would comprise impression, click-through, and a limited set of types of advertiser-defined actions. The limited set may comprise two types of actions. In that case, a multi-element bid would comprise four elements—specifically, the money amounts that are deducted, respectively, upon the occurrence of an impression referral, a click-through referral, a first action referral, and a second action referral. Because the web sites of two different advertisers can be very different in purpose, and because a particular advertiser could have very different purposes underlying two different advertising campaigns, it is preferred that the first and second action elements of the bid be advertiser-defined. For example, one advertiser could define the first action as response to a certain promotion, whereas another advertiser could define the first action as a sale of a good or service.

An impression referral to an advertiser occurs when that advertiser's listing appears in the search results listing. In the event of an impression referral to an advertiser, the account identification information is recorded in that advertiser's account along with information about the event as an impression referral event. Since the information obtained through this mechanism conclusively matches an account identifier with a URL in a manner not possible using conventional server system logs known in the art, accurate account debit records will be maintained.

Click-through referrals to advertisers occur and are handled as described above in the first embodiment. In alternative embodiments, click-through referral processing may be modified according to particular design or implementation goals and requirements.

An action referral to an advertiser occurs when the searcher performs that action associated with the advertiser's web site, after the searcher has clicked through to the advertiser's web site. Upon receipt of notification from the advertiser that the action has occurred, the account identification information is recorded in that advertiser's account along with information about the event as a specific action event. Since the information obtained through this notification mechanism conclusively matches authentication information associated with that advertiser, accurate account debit records will be maintained.

Notwithstanding the first and second embodiments above, the disclosure herein addresses all possible combinations of referral types upon which to bid. By way of example, an embodiment could have advertisers bidding on only impression referrals and click-through referrals. This embodiment would provide the benefit of having the referral events noticed and recorded by search engine web server 24 without the cooperation of advertisers. In a second example, another embodiment could have advertisers bidding on only one action referral. This embodiment would provide the benefit of aligning with the advertiser interest in paying for highly targeted, directed, and specific events. A second class of users at client computers 12 may comprise searchers seeking specific information on the web. The searchers may access, through their browsers 16, a search engine web page 36 residing on web server 24. The search engine web page 36 includes a query box in which a searcher may type a search term comprising one or more keywords. Alternatively, the searcher may query the search engine web server 24 through a query box hyperlinked to the search engine web server 24 and located on a web page stored at a remote web server. When the searcher has finished entering the search term, the searcher may transmit the query to the search engine web server 24 by clicking on a provided hyperlink. The search engine web server 24 will then generate a search result list page and transmit this page to the searcher at the client computer 12.

The searcher may click on the hypertext links associated with each listing on the search results page to access the corresponding web pages. The hypertext links may access web pages anywhere on the Internet, and include paid listings to advertiser web pages 18 located on advertiser web servers 14. In one embodiment, the search result list also includes non-paid listings that are not placed as a result of advertiser bids and are generated by a conventional World Wide Web search engine, such as the INKTOMI, LYCOS, or YAHOO! search engines. The non-paid hypertext links may also include links manually indexed into the database 40 by an editorial team. Most preferably, the non-paid listings follow the paid advertiser listings on the search results page.

Figure 2:
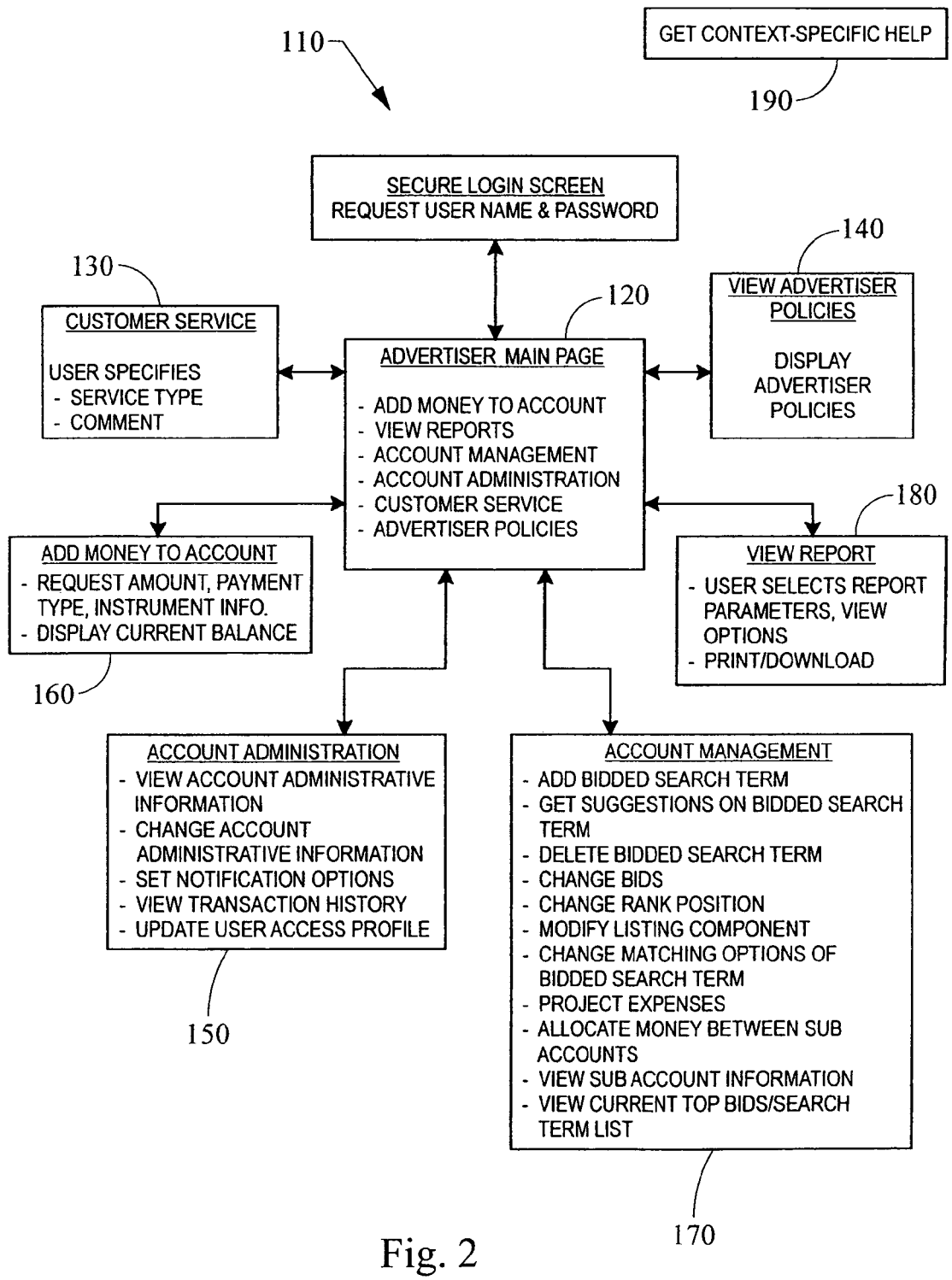
FIG. 2 is a chart of menus, display screens, and input screens used in one embodiment of the present invention.

FIG. 2 is a diagram showing menus, display screens, and input screens presented to an advertiser accessing the account management server 22 through a conventional browser program 16. The advertiser, upon entering the URL of the account management server 22 into the browser program 16 of FIG. 1, invokes a login application, discussed below as shown at screen 110 of FIG. 2, running on the processing system 34 of the server 22. Once the advertiser is logged-in, the processing system 34 provides a menu 120 that has a number of options and further services for advertisers. These items, which will be discussed in more detail below, cause routines to be invoked to either implement the advertiser's request or request further information prior to implementing the advertiser's request. In one embodiment, the advertiser may access several options through menu 120, including requesting customer service 130, viewing advertiser policies 140, performing account administration tasks 150, adding money to the advertiser's account 160, managing the account's advertising presence on the search engine 170, and viewing activity reports 180. Context-specific help 190 may also generally be available at menu 120 and all of the above-mentioned options.

Figure 3:
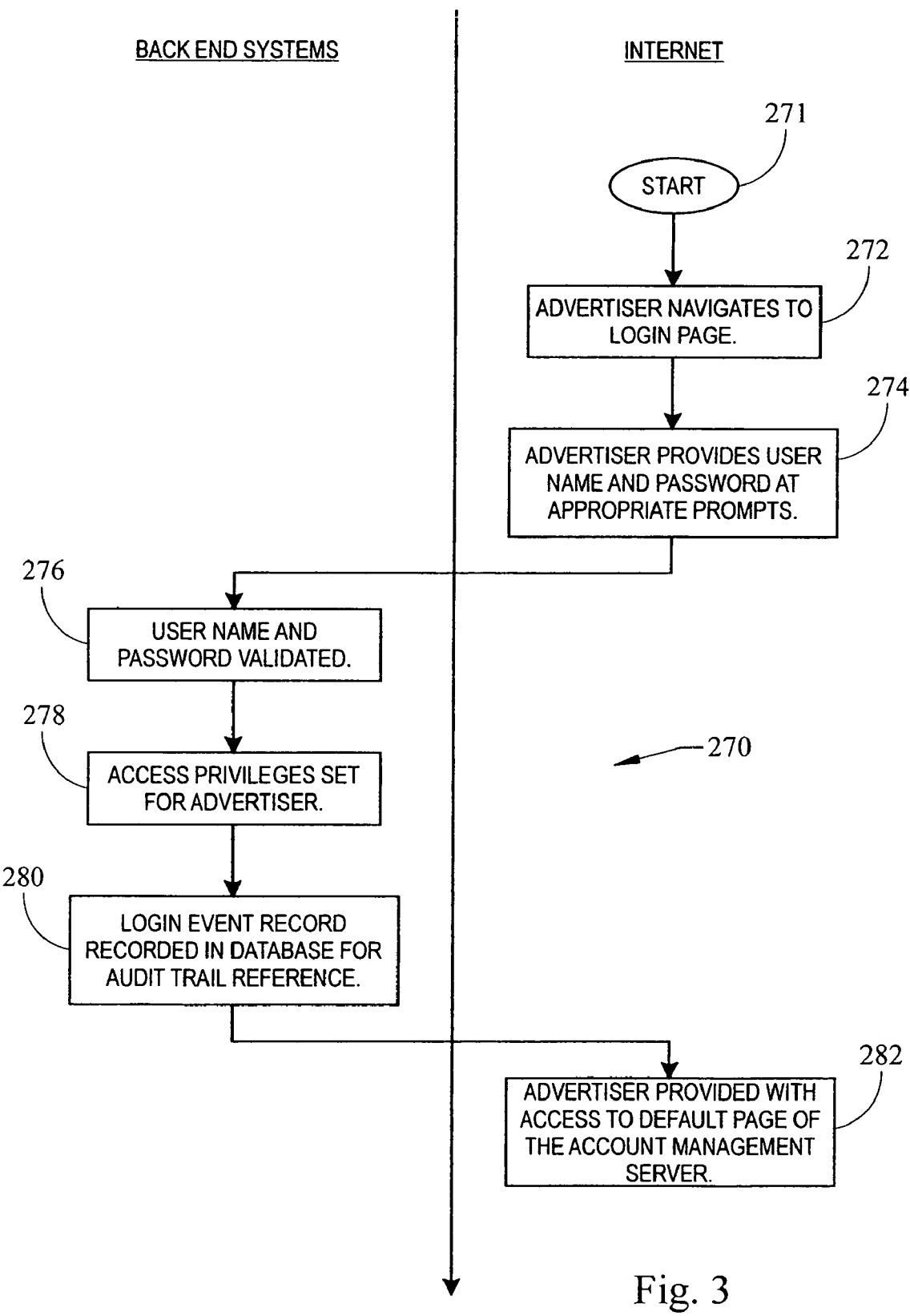
FIG. 3 is a flow chart illustrating the advertiser user login process performed in one embodiment of the present invention.
Figure 4:
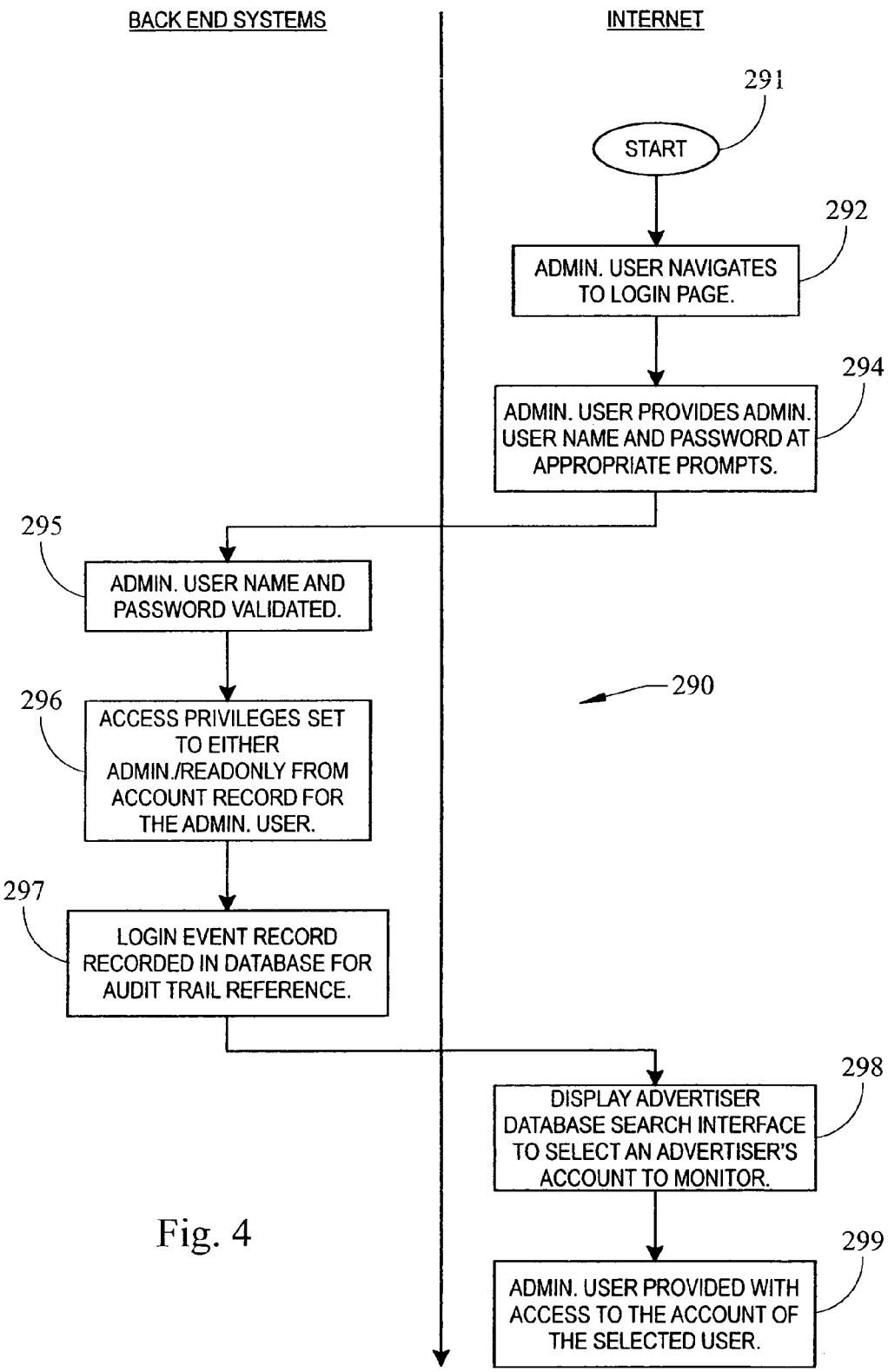
FIG. 4 is a flow chart illustrating the administrative user login process performed in one embodiment of the present invention.

The login procedure of the embodiment is shown in FIGS. 3 and 4 for two types of user. FIG. 3 shows the login procedures 270 for an advertiser. FIG. 4 shows the login procedures 290 for an administrator managing and maintaining the system and method. As discussed above, the advertiser or administrator at a client computer 12 must first use a browser program at steps 271 or 291 to access the account management server. After the advertiser navigates to the URL of the login page to start the login process at step 272 or 292, the processing system 34 of the account management server 22 invokes a login application at steps 274 or 294. According to this application, the processor provides an input screen 110 (FIG. 2) that requests the advertiser's or administrator's user name and password. These items of information are provided at steps 276 or 296 to a security application known in the art for the purpose of authentication, based on the account information stored in a database stored in storage 32 of account management server 22.

According to FIG. 3, after the user has been authenticated as an advertiser, the advertiser is provided with the menu screen 120 of FIG. 2 and limited read/write access privileges only to the corresponding advertiser account, as shown in step 278. The advertiser login event 278 may also be recorded in step 280 in an audit trail data structure as part of the advertiser's account record in the database. The audit trail is preferably implemented as a series of entries in database 38, where each entry corresponds to an event wherein the advertiser's account record is accessed. Preferably, the audit trail information for an account record may be viewed by the account owner and other appropriate administrators.

However, if the user is authenticated as an administrator in step 295 of FIG. 4, the administrator is provided with specified administrative access privileges to all advertiser accounts as shown in step 296. The administrator login event 296 is recorded in step 297 in the audit trail data structure portion of the administrator's account record. This audit trail is preferably implemented as a series of entries in database 38, where each entry corresponds to an event wherein the administrator's account record is accessed. Most preferably, the administrator's audit trail information may be viewed by the account owner and other appropriate administrators.

Furthermore, instead of the general advertiser main menu shown to the authenticated advertiser users in step 282, the authenticated administrator is provided in step 298 with access to search the database 38 of advertiser accounts. Preferably, a database search interface is provided to the administrator that enables the administrator to select an advertiser account to monitor. For example, the interface may include query boxes in which the administrator may enter an account number or username or contact name corresponding to an account the administrator wishes to access. When the administrator selects an advertiser account to monitor in step 299, the administrator is then brought to the main advertiser page 120 of FIG. 2, which is also seen by the advertisers.

Access to the account information 32 located on the account management server 22 is restricted to users having an account record on the system, as only those users are provided with a valid login name and password. Password and login name information is stored along with the user's other account information in the database 38 of the account management server 22, as shown in FIG. 1. Account information, including a login user name and password, is entered in the database 38 of FIG. 1 via a separate online registration process that is outside the scope of the present disclosure.

Figure 5:
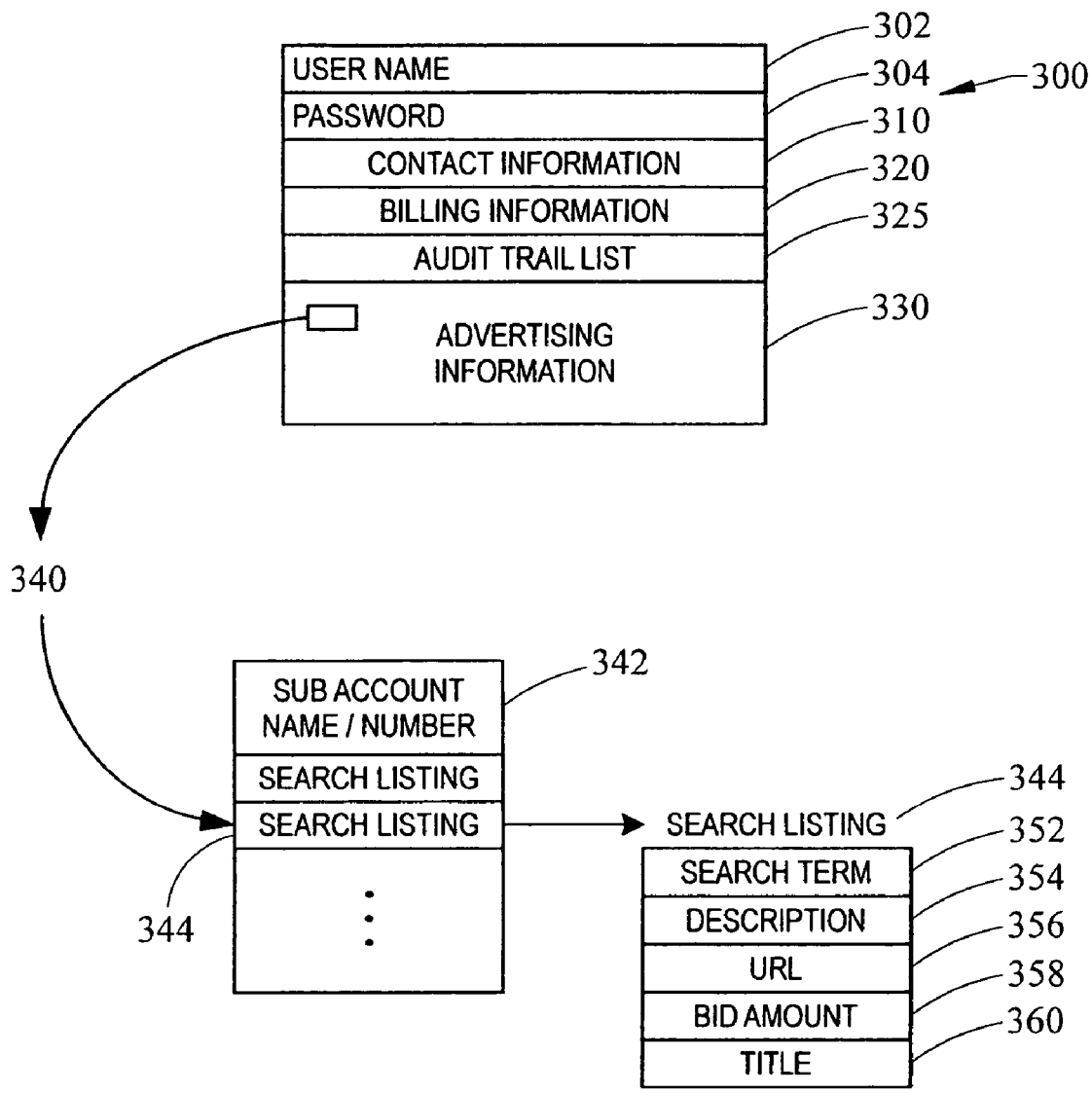
FIG. 5 is a diagram of data for an account record for use with one embodiment of the present invention.

FIG. 5 is a diagram showing the types of information contained in each advertiser account record 300 in the database. First, an advertiser account record 300 contains a username 302 and a password 304, used for online authentication as described above. The account record also contains contact information 310. Examples of contact information include a contact name, company name, street address, phone, e-mail address.

Contact information 310 is preferably utilized to direct communications to the advertiser when the advertiser has requested notification of key advertiser events under the notification option, discussed below. The account record 300 also contains billing information 320 such as a current balance and credit card information. The billing information 320 contains data accessed when the advertiser selects the option to add money to the advertiser's account. In addition, certain billing information, such as the current balance, may trigger events requiring notification under the notification option. The audit trail section 325 of an account record 300 contains a list of all events wherein the account record 300 is accessed. Each time an account record 300 is accessed or modified, by an administrator or advertiser a short entry describing the account access and/or modification event will be appended to the audit trail section 330 of the administrator or advertiser account that initiated the event. The audit trail information may then be used to help generate a history of transactions made by the account owner under the account.

The advertising information section 330 contains information needed to conduct the online bidding process, wherein a position is determined for a web site description and hyperlink within a search result list generated by a search engine. The advertising data 330 for each user account 300 may be organized as zero or more subaccounts 340. Each subaccount 340 comprises at least one search listing 344. Each search listing corresponds to a bid on a search term. An advertiser may utilize subaccounts to organize multiple bids on multiple search terms, or to organize bids for multiple web sites. Subaccounts are also particularly useful for advertisers seeking to track the performance of targeted market segments. The subaccount superstructure is introduced for the benefit of the advertisers seeking to organize their advertising efforts, and does not affect the method of operation of the embodiments described herein. Alternatively, the advertising information section need not include the added organizational layer of subaccounts, but may simply comprise one or more search listings.

The search listing 344 corresponds to a search term/bid pairing and contains key information to conduct the online competitive bidding process. Preferably, each search listing comprises the following information: search term 352, web site description 354, URL 356, bid element amounts 358, and a title 360. Additional information may be added or some of this information may be deleted or re-cast according to particular design goals. The search term 352 comprises one or more keywords which may be common words in English or any other language. Each keyword in turn comprises a character string. The search term is the object of the competitive online bidding process. The advertiser selects a search term to bid on that is relevant to the content of the advertiser's web site. Ideally, the advertiser may select a search term that is targeted to terms likely to be entered by searchers seeking the information on the advertiser's web site, although less common search terms may also be selected to ensure comprehensive coverage of relevant search terms for bidding.

In an alternative embodiment, the system, instead of the advertiser, selects the search term or terms related to the advertiser's web site. Certain advertisers may prefer to be saved the work of determining these keywords. Moreover, to the extent the system allows the advertiser to bid on action events, and the advertiser bids only on action events, the advertiser has less incentive to be concerned about compiling an accurate search term list related to its web site. Since that advertiser pays only upon the occurrence of the action, that advertiser may have less incentive to have its web site associated with as many different search terms as possible, even entirely unrelated search terms. In cases like this, the system would preferably select the search terms appropriate to that advertiser's web site in order to maximize relevance of the search results.

The web site description 354 is a short textual description, preferably less than 190 characters, of the content of the advertiser's web site and may be displayed as part of the advertiser's entry in a search result list. The search listing 344 may also contain a title 360 of the web site that may be displayed as the hyperlinked heading to the advertiser's entry in a search result list. The URL 356 contains the Uniform Resource Locator address of the advertiser's web site. When the user clicks on the hyperlink provided in the advertiser's search result list entry, the URL is provided to the browser program. The browser program, in turn, accesses the advertiser's web site through the redirection mechanism discussed above. The URL may also be displayed as part of the advertiser's entry in a search result list.

In one embodiment there is only a single bid element amount 358 corresponding, preferably, to a click-through event. In this embodiment, bid element amount 358 is a money amount bid by an advertiser for a listing. This money amount is deducted from the advertiser's prepaid account or is recorded for advertiser accounts that are invoiced for each time a search is executed by a user on the corresponding search term and the search result list hyperlink is used to refer the searcher to the advertiser's web site.

In a second embodiment, there are multiple bid element amounts 358. These multiple bid element amounts correspond to one or more of an impression event, a click-through event, and one or more action events. Multiple bid element amounts 358 corresponding to all of an impression event, a click-through event, and one or more action events will be discussed.

Bid element amount 358 associated with an impression event is the money amount deducted from the advertiser's pre-paid account upon the occurrence of that event. Bid element amount 358 associated with a click-through event is the money amount deducted from the advertiser's pre-paid account upon the occurrence of that event. Bid element amounts 358 associated with action events are the money amounts deducted from the advertiser's pre-paid account upon the system receiving notification of the occurrence of the applicable action event.

Finally, a rank value is a value generated dynamically, preferably by the processing system 34 of the account management server 22 shown in FIG. 1, each time an advertiser places a bid or a searcher enters a search query. The rank value of an advertiser's search listing helps to determine the placement location of the advertiser's entry in the search result list generated when a search is executed on the corresponding search term. Preferably, rank value is an ordinal value determined in a direct relationship to the bid value 358; the higher the bid value, the higher the rank value, and the more advantageous the placement location on the search result list. In one embodiment, the rank value of 1 is assigned to the highest bid value with successively higher ordinal values (e.g., 2, 3, 4, . . . ) associated with successively lower ranks and assigned to successively lower bid values. Under an alternative preferred embodiment, the bid values are used in combination with one or more other factors in determining rank value. As an example of other factors, certain measures of relevance that are independent of the bid value could be used.

In one embodiment, in which there is only a single bid element amount 358, the bid value is the value of the bid element amount 358. Preferably, this value is determined simply by using the exact amount of the bid element as its value. This method of determination has the benefit of simplicity and clarity.

Alternatively, and also preferably, the value of bid element amount 358 can be determined by calculating the market value of that amount. Market value of the amount is calculated as the product of the amount and the probability of occurrence of the referral event with which this bid element is associated. In this embodiment, that referral event is a click-through. Accordingly, the probability to be calculated is the probability of a click-through. Calculating market value of the bid element amount has the benefit of more accurately valuing the placement locations on the search result list.

One way to determine the probability of a click-through for a particular listing is to use the click through rate over a specified period of time. In one embodiment, click through rate is defined as the ratio of the Number of Clicks to the Number of Impressions. Preferably, the probability of a click-through for a particular listing is calculated taking into consideration the higher average click-through rates ("CTR") of more prominent positions in the search results, and the lower average CTR of less prominent positions. More preferably, the calculation of the probability of a click-through for a particular listing also takes into account the comparative attractiveness of that particular listing relative to its competition.

Most preferably, the probability of a click-through for a particular listing is calculated as the product of the expected CTR for the contemplated position of the listing when occupied by a listing of average attractiveness to the user, and a number representing the rank-independent comparative attractiveness of the particular listing relative to the average listing for that term. This comparative attractiveness factor distinguishes between a listing of less than average attractiveness, for which this factor would be less than one, a listing of typical or average attractiveness, for which this factor would be one, and a listing of unusual attractiveness, for which this factor is greater than one.

By way of example, consider a listing of interest to only a small fraction of users who perform a particular search. One example of such a listing is a listing for a service that provides cross-country shipping for automobiles, when matched to a user search for "cars". Only a small fraction of users performing a search on "cars" have an interest in shipping an automobile at that time. Many users read the title and the description components of the listing provided by the advertiser before deciding to click through to the listed site. Most of those users will skip that listing, and some fraction of them will bother to read on for another listing that addresses the aspect of "cars" that matches or catches their interest. Only those users who are interested in transporting an automobile, plus that fraction of users who don't read the titles and descriptions of listings before clicking, will click through to the listed site.

This behavior is as intended by the advertiser, who crafts the title and description of the listing to encourage users who are likely to respond to the propositions of the advertiser's web site to click on the listing, with consequent cost to the advertiser, and conversely, to discourage users from clicking whose expected business value is less than the cost due to the search engine operator for the click through. The incentive for an advertiser to represent accurately the nature of a listed web page is one of the advantages of a cost per click element in the cost of advertiser participation.

However, this listing's less-than-typical CTR at a given position in the search results for "cars", compared to a typical listing matching "cars", means that the market value of this listing must be adjusted down relative to those typical listings. This adjustment is represented by the comparative attractiveness factor described above.

Preferably, the comparative attractiveness factor for a listing is calculated as a normalized probability. This normalized probability is equal to the ratio of the CTR for that listing over a specified period of time, and the average expected or intrinsic CTR applicable to the various rankings held by that listing over the same period of time. Calculated this way, the comparative attractiveness factor references how the listing performed with respect to attracting click-throughs, relative to how the listing should have performed given the rankings it held. How the listing should have performed is captured by the intrinsic CTR value.

Intrinsic CTR applicable to a particular ranking refers to the fact that, over a sufficient number of searches, an average CTR for all listings that held that ranking can be calculated. This calculated average CTR is considered the intrinsic CTR applicable to that ranking. For a listing of average attractiveness, the CTR expected for that listing at a particular ranking is equal to the intrinsic CTR applicable to that ranking. Intrinsic CTR can be calculated for each search term, for certain groups or categories of search terms, or, most simply, across all search terms.

In calculating the denominator of the normalized probability for a listing, an average intrinsic CTR value is used. That average intrinsic CTR value concerns the fact that over a period of time, a listing can hold various rankings. Each of those rankings has its own intrinsic CTR. There are a number of alternative preferable methods for calculating the average intrinsic CTR value which is used as the denominator of the normalized probability. Under one such method, the denominator is calculated as the ratio of the sum of all of the intrinsic CTRs applicable to all of the rankings held by the listing over a period of time, and the number of impressions of that listing over the same period of time. Under a second preferable method, the average of all the rankings held by the listing over a period of time is first calculated. Then, the denominator of the normalized probability is set to the intrinsic CTR applicable to that calculated average ranking. Under this method, the average ranking will tend not to be an integer. In accordance with the embodiments herein, various devices and techniques can be used for handling this situation. One way is to use, as the average ranking in the calculation of the average intrinsic CTR value, the integer closest to the calculated average ranking. Alternatively, intrinsic CTR can be expressed as a continuous function, thereby accommodating the concept of fractional rankings.

Once the normalized probability has been calculated, the market value of bid element amount 358 for a listing can now be calculated. That market value is calculated as the product of bid element amount 358, the intrinsic CTR for the contemplated position of the listing, and the normalized probability for the listing. This calculation results in a money amount that the advertiser is expected to pay upon the completion of the next search in which this listing is included. As such, these money amounts for all listings for each search term can be sorted by the amounts, and the listings can be assigned ordinal rank values.

Most preferably, the market value of bid element amount 358 for a listing is calculated as the product of bid element amount 358 and the normalized probability for the listing. In the preferred embodiment, the intrinsic CTR for the contemplated position of the listing is not used in the computation of market value. The reason for this is that this value does not change the ranking. In other words, the ranking determined by the product of bid element amount 358 and the normalized probability is the same as the ranking determined by the product of those two values and the intrinsic CTR for the contemplated position of the listing. Accordingly, computing the latter value is unnecessary.

In the preferred embodiment, the market value is a normalized value of bid element 358. This normalized value is expressed in units of "cost-per-click" ("CPC"), just as is the non-normalized bid element amount 358. The difference between the two is that the normalized value takes into account the comparative attractiveness of the listings. If a listing is more attractive than average as demonstrated by the click-through behavior of searchers, then for the purposes of ranking, the market value of bid element amount 358 for that listing will be higher than that amount. Conversely, if the listing is less attractive than average, then for the purposes of ranking the market value will be less than the actual bidded amount. The normalized value resolves the problem illustrated by the example above concerning searches for "cars". The normalized value represents a bid for a listing of average attractiveness that is, from the point of view of the search engine, monetarily equivalent to bid element 358 for the current listing. The normalized value allows the bids for all listings to be compared as if all listings were of average attractiveness. In a second embodiment, there are multiple bid element amounts 358 corresponding, preferably, to an impression event, a click-through event, and one or more action events. In this embodiment, the bid value is calculated as a combination of the values of each of the bid elements. In one embodiment, the combination is a sum.

Preferably, the value of a bid element corresponding to an impression event is determined simply as the actual amount of the bid element, since the probability of occurrence of the impression event is 1 if the listing is selected for display.

The value of a bid element corresponding to a click-through event is determined as described above in connection with one embodiment.

Finally, the value of a bid element corresponding to an action event is calculated as the product of the amount of the bid element and the probability of occurrence of the action event with which this bid element is associated. One way to determine this probability is to use the action rate over a specified period of time. In one embodiment, the action rate is defined to be the number of actions to the number of impressions. Because actions generally occur on the advertiser's web site, the probability of the action event can be treated as independent of the particular ranking of the listing that led to the action.

Most preferably, the probability of an action for a particular listing would be calculated as the ratio of the action rate for that listing over a specified period of time, and the intrinsic CTR applicable to the average ranking of that listing over the same period of time. Calculating this ratio achieves a normalization of the action rate for the listing. Although the probability that the user will perform the action on the advertiser's web site after the user has clicked through to that web site is independent of the ranking of the listing that led to the action, the ranking does in fact affect the number of opportunities there were for that action to have occurred. This normalizing ratio is necessary to put different bids on equal footing with respect to opportunities for the actions to occur. In this way comparisons between different bids are based on truer relative values of the respective bids.

Most preferably, in calculating the value of multiple bid element amounts 358 as the sum of the values of each of the bid elements, the value of each bid element is expressed in consistent units. One way to do so is to calculate the value of each bid element in CPC units. CPC units are achieved in valuing the bid element amount for a click-through as the product of that amount and the normalized probability, as described above. Similarly, CPC units are achieved in valuing the bid element amount for an action as the product of that amount and the normalizing ratio, also as described above. These two values can be added, and the result will still be expressed in CPC units. However, the bid element amount for impression is expressed in cost-per-impression ("CPM") units. In order to add the value of this bid element amount to the values of other amounts which are expressed in CPC units, a transformation must first be applied to the bid element amount for impression.

One preferable transformation is to divide the bid element amount for impression by the intrinsic CTR applicable to a particular ranking R for the search term to which the current listing applies. For example, if R is 1, then the particular ranking is ranking number 1. Then, if the bid element amount for impression is divided by the intrinsic CTR for ranking 1, the resultant value is expressed in CPC units. Specifically, in this example, the resultant value will be equivalent to the amount of a CPC bid for a listing of average attractiveness, where that amount would have achieved a number 1 ranking. Now if this transformed value of the bid element amount for an impression is added to the normalized values of the bid element amounts for click-through and for one or more actions, then the resultant value will be expressed in CPC units. This resultant value will resolve the "attractiveness" problem described above.

In accordance with the illustrated embodiments, any ranking R can be used, so long as the same R is used for all listings for a particular search term. In this way, consistent "apples to apples" comparisons of value can be made between the multiple element bids of different listings. In the above example, where R is 1, the least amount of weight is accorded the bid for impression as against the bids for click-through or for actions. The larger the R, the higher the relative weight is accorded the bid for impression in valuing the entire multiple element bid.

The foregoing calculation allows not only for consistent "apples to apples" comparisons to be made between different bids, but also for a precise meaning to be attributed to each bid. That meaning is the "monetarily equivalent bid for clickthrough for a listing of average attractiveness". In other words, each multi-element bid is transformed into the monetarily equivalent bid for click-through for a listing of average attractiveness.

The foregoing describes calculating the value of multiple bid element amounts 358 in units of "effective CPC". Equivalently, the value of multiple bid element amounts 358 could be calculated in units of "effective CPM", instead of effective CPC. The effective CPM value of a multiple element bid is calculated as the product of the effective CPC value of that bid and the intrinsic CTR applicable to the same ranking R used in calculating effective CPC. The effect on ranking is exactly the same. Similarly, other, equivalent, "effective values" could be used.

When the system of the present embodiments receives notification of the occurrence of an action, the system records that occurrence. When the action occurs within the system, the system can generate that notification. Sometimes, however, actions occur on the advertiser's web site. In those cases, the advertiser must either send notification of the action event, or permit the system to have access to the advertiser's web site to generate the notification, in order for the event to be recorded by the system. In the case where notification is to be sent by the advertisers, advertisers will have an incentive to provide this notification. If an advertiser never sends notification of action events that occurred, then the action rate will be calculated as 0, and so the value of the bid element for that action will be treated also as 0. In that case, it does not matter what amount what the advertiser bids for that action. If the action never occurs according to the understanding of the system, then that bid element is valued at 0. In this way, the present embodiment provides sufficient incentive for the system to work as designed. In an alternative embodiment, suitable method or apparatus could be implemented to cause the notification to be sent by the user's browser operating on the user's personal computer or other device, rather than having to receive it from the advertiser. Generally the advertiser would have to cooperate to enable such an embodiment. Once logged in, an advertiser can perform a number of straightforward tasks set forth in menu 120 of FIG. 2, including viewing a list of rules and policies for advertisers, and requesting customer service assistance. These items cause routines to be invoked to implement the request. For example, when "Customer Service" is selected, an input screen 130 is displayed to allow the advertiser to select the type of customer service requested. In addition, forms may be provided on screen 130 so that an advertiser may type a customer comment into a web-based input form.

When "View Advertiser Policies" is selected, a routine will be invoked by processing system 34 of the account management server 22 FIG. 1. As shown in FIG. 2, the routine will display an informational web page 140. The web page 140 sets forth the advertiser policies currently in effect. One example is, "All search listing descriptions must clearly relate to the search term."

Menu 120 of FIG. 2 also includes an "Account Administration" selection 150 which allows an advertiser, among other things, to view and change the advertiser's contact information and billing information, or update the advertiser's access profile, if any. Web-based forms well known in the art and similar to those discussed above are provided for updating account information.

The "Account Administration" menu also includes a selection enabling an advertiser to view the transaction history of the advertiser's account. Under the "View Transaction History" selection, the advertiser may invoke routines to view a listing of past account transactions. Examples include adding money to account, adding or deleting bidded search terms, or changing bid element amounts. Additional routines may be implemented to permit advertisers to display a history of transactions of a specified type, or that occur within a specified time. The transaction information may be obtained from the audit trail list 325 of FIG. 5, described above. Clickable buttons that may be implemented in software, web-based forms, and/or menus may be provided as known in the art to enable advertisers to specify such limitations.

In addition, the "Account Administration" menu 150 of FIG. 2 includes a selection enabling an advertiser to set notification options. Under this selection, the advertiser may select options that will cause the system to notify the advertiser when certain key events have occurred. For example, the advertiser may elect to set an option to have the system send conventional electronic mail messages to the advertiser when the advertiser's account balance has fallen below a specified level. In this manner, the advertiser may receive a "warning" to replenish the account before the account is suspended. In one embodiment, when the account is suspended, the advertiser's listings will no longer appear in search result lists. Another key event for which the advertiser or web site promoter may wish notification is a change in position of an advertiser's listing in the search result list generated for a particular search term. For example, an advertiser may wish to have the system send a conventional electronic mail message to the advertiser if the advertiser has been outbid by another advertiser for a particular search term. In one embodiment, when the advertiser has been outbid, the advertiser's listing will appear in a position farther down on the search result list page than previously. When one of the system-specified key events occurs, a database search is triggered for each affected search listing. The system will then execute the appropriate notification routine in accordance with the notification options specified in the advertiser's account.

Referring back to FIG. 2, a selection also appears in menu 120 that permits an advertiser to add money to the advertiser's account, so that the advertiser will have funds in their account to pay for referrals to the advertiser through the search results page. Preferably, only advertisers with funds in their advertiser's accounts may have their paid listings included in any search result lists generated. Most preferably, advertisers meeting selected business criteria may elect, in place of maintaining a positive account balance at all times, incur account charges regardless of account balance and pay an invoiced amount at regular intervals which reflects the charges incurred by actual referrals to the advertiser generated by the search engine. The process that is executed when the "Add Money to Account" selection is invoked is shown in further detail in FIG. 6, beginning at step 602. When the "Add Money to Account" selection is clicked in step 604, a function is invoked which receives data identifying the advertiser and retrieves the advertiser's account from the database. The executing process then stores the advertiser's default billing information and displays the default billing information for the advertiser in step 606. The displayed billing information includes a default amount of money to be added, a default payment type, and default instrument information.

In one embodiment, an advertiser may add funds online and substantially in real time through the use of a credit card, although the use of other payment types is certainly well within the scope of the present embodiments. For example, in an alternate embodiment, advertisers may add funds to their account by transferring the desired amount from the advertiser's bank account through an electronic funds verification mechanism known in the art such as debit cards, in a manner similar to that set forth in U.S. Pat. No. 5,724,424 to Gifford.

In another alternate embodiment, advertisers can add funds to their account using conventional paper-based checks. In that case, the additional funds may be updated in the account record database through manual entry. The instrument information includes further details regarding the type of payment. For example, for a credit card, the instrument information may include data on the name of the credit card, such as MasterCard, Visa, or American Express, the credit card number, the expiration date of the credit card, and billing information for the credit card, such as billing name and address. In one embodiment, only a partial credit card number is displayed to the advertiser for security purposes.

The default values displayed to the advertiser are obtained from a persistent state, e.g., stored in the account database. In an embodiment, the stored billing information values may comprise the values set by the advertiser the last or most recent time the process of adding money was invoked and completed for the advertiser's account. The default billing information is displayed to the advertiser in a web-based form. The advertiser may click on the appropriate text entry boxes on the web-based form and make changes to the default billing information. After the advertiser completes the changes, the advertiser may click on a hyperlinked "Submit" button provided on the form to request that the system update the billing information and current balance in step 608. Once the advertiser has requested an update, a function is invoked by the system which validates the billing information provided by the advertiser and displays it back to the advertiser for confirmation, as shown in step 610. The confirmation billing information is displayed in read-only form and may not be changed by the advertiser.

The validation step functions as follows. If payment is to be debited from an advertiser's external account, payment may be authenticated, authorized and completed using the system set forth in U.S. Pat. No. 5,724,424 to Gifford. However, if the payment type is by credit card, a validating algorithm is invoked by the system, which validates the credit card number using a method such as that set forth in U.S. Pat. No. 5,836,241 to Stein et al. The validating algorithm also validates the expiration date via a straightforward comparison with the current system date and time. In addition, the function stores the new values in a temporary instance prior to confirmation by the advertiser.

Once the advertiser ascertains that the displayed data is correct, the advertiser may click on a "Confirm" button provided on the page to indicate that the account should be updated in step 612. In step 612, a function is invoked by the system which adds money to the appropriate account balance, updates the advertiser's billing information, and appends the billing information to the advertiser's payment history. The advertiser's updated billing information is stored to the persistent state in the account record database from the temporary instance.

Within the function invoked at step 612, a credit card payment function may be invoked by the system at step 614. In an alternate embodiment, other payment functions such as debit card payments may be invoked by defining multiple payment types depending on the updated value of the payment type.

If the payment type is credit card, the user's account is credited immediately at step 616, the user's credit card having already been validated in step 610. A screen showing the status of the add money transaction is displayed, showing a transaction number and a new current balance, reflecting the amount added by the just-completed credit card transaction.

In an alternate embodiment, after the money has been added to the account, the amount of money added to the account may be allocated between subaccounts the end of the add money process at step 616. If the advertiser has no subaccounts, all of the money in the account is a general allocation. However, if the advertiser has more than one subaccount, the system will display a confirmation and default message prompting the advertiser to "Allocate Money Between Subaccounts".

Figure 6:
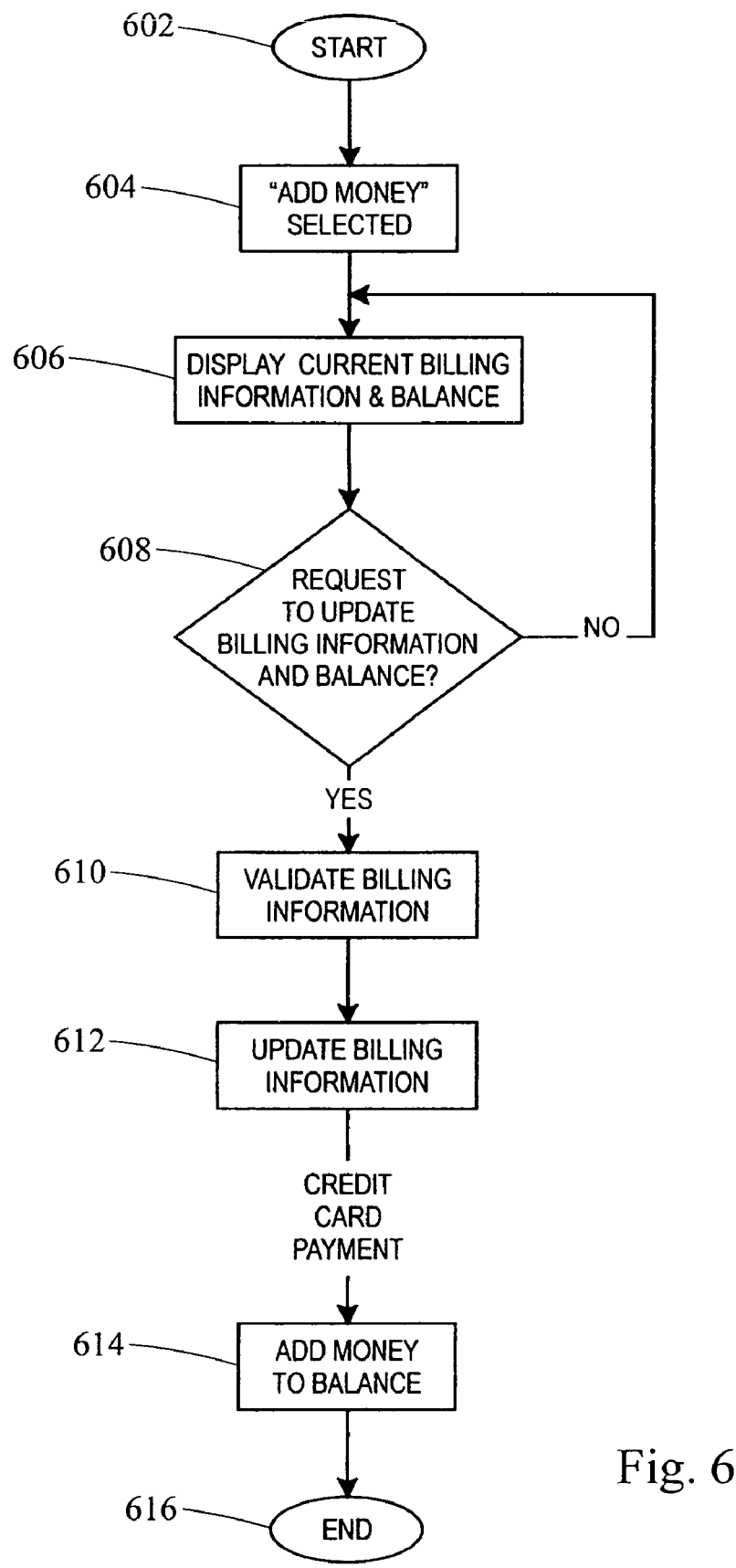
FIG. 6 is a flow chart illustrating a method of adding money to an account record used in one embodiment of the present invention.

The menu selection "Allocate Money Between Subaccounts" may be invoked when money is added to the advertiser account after step 616 of FIG. 6, or it may be invoked within the "Account Management" menu 170 shown in FIG. 2. The "Account Management" menu 170 is accessible from the Advertiser Main Page 120, as shown in FIG. 2. This "Allocate Money Between Subaccounts" menu selection permits an advertiser to allocate current and any pending balances of the advertiser's account among the advertiser's subaccounts. The system will then update the subaccount balances. The current balance allocations will be made in real time, while the pending balance allocations will be stored in the persistent state. A routine will be invoked to update the subaccount balances to reflect the pending balance allocations when the payment for the pending balance is processed. Automatic notification may be sent to the advertiser at that time, if requested. This intuitive online account management and allocation permits advertisers to manage their online advertising budget quickly and efficiently. Advertisers may replenish their accounts with funds and allocate their budgets, all in one easy web-based session. The computer-based implementation eliminates time consuming, high cost manual entry of the advertiser's account transactions.

The "Allocate Money Between Subaccounts" routine begins when an advertiser indicates the intent to allocate money by invoking the appropriate menu selection at the execution points indicated above. When the advertiser indicates the intent to allocate, a function is invoked by the system to determine whether there are funds pending in the current balance, such as unactivated account credits, that have not yet been allocated to the advertiser's subaccounts, and displays the balance selection options. In an embodiment, an account instance is created and a pending current balance account field is set from the persistent state.

If there are no unallocated pending funds, the system may display the current available balances for the account as a whole as well as for each subaccount. The advertiser then distributes the current available balance between subaccounts and submits a request to update the balances. A function is invoked which calculates and displays the current running total for subaccount balances. The current running total is stored in a temporary variable which is set to the sum of current balances for all subaccounts for the specified advertiser. The function also validates the new available subaccount balances to make sure that the total does not exceed the authorized amount. If the new advertiser-set available subaccount balances does not exceed the authorized amount, a function is invoked which will update all of the subaccount balances in the persistent state and display the update in read-only format.

If there are pending funds in the current account balance, the pending funds must be allocated separately from the available current balance. The pending funds will then be added into the available current balance when the funds are received. The function must therefore prompt the advertiser to choose between allocating pending funds or allocating available funds. The allocating pending funds selection works in much the same manner as the allocating available funds selection outlined above. After the advertiser chooses to allocate pending funds, a routine is invoked to display current pending balances for the account and the subaccounts. The advertiser distributes the pending subaccount balances between campaigns and submits a request to update the balances. A function is invoked which calculates and displays the current running totals for the pending subaccount balances. This function also validates the new pending subaccount allocations to make sure that the allocations do not exceed any authorized amount. The current running total of pending allocations is set to the sum of current pending balances for all subaccounts for the advertiser. If the new user-set pending subaccount balances or the total of such balances do not exceed any authorized amount, the function will update all of the pending subaccount allocations in the persistent state, e.g. the advertiser's account in the database, and display the update in read-only format.

As indicated above and shown in FIG. 2, a routine displaying the account management menu 170 may be invoked from the advertiser main menu 120. Aside from the "Allocate Money Between Subaccounts" selection described above, the remaining selections all use to some extent the search listings present in the advertiser's account on the database, and may also affect the advertiser's entry in the search result list. Thus, a further description of the search result list generated by the search engine is needed at this point.

When a remote searcher accesses the search query page on the search engine web server 24 and executes a search request according to the procedure described previously, the search engine web server 24 preferably generates and displays a search result list where the "canonicalized" entry in search term field of each search listing in the search result list exactly matches the canonicalized search term query entered by the remote searcher. The canonicalization of search terms used in queries and search listings removes common irregularities of search terms entered by searches and web site promoters, such as capital letters and pluralizations, in order to generate relevant results. However, alternate schemes for determining a match between the search term field of the search listing and the search term query entered by the remote searcher are well within the scope of the present embodiments. For example, string matching algorithms known in the art may be employed to generate matches where the keywords of the search listing search term and the search term query have the same root but are not exactly the same, such as computing vs. computer. Alternatively a thesaurus database of synonyms may be stored at search engine web server 24, so that matches may be generated for a search term having synonyms. Localization methodologies may also be employed to refine certain searches. For example, a search for "bakery" or "grocery store" may be limited to those advertisers within a selected city, zip code, or telephone area code. This information may be obtained through a cross-reference of the advertiser account database stored at storage 32 on account management server 22. Finally, internationalization methodologies may be employed to refine searches for users outside the United States. For example, country or language-specific search results may be generated, by a cross-reference of the advertiser account database, for example.

Figure 7:
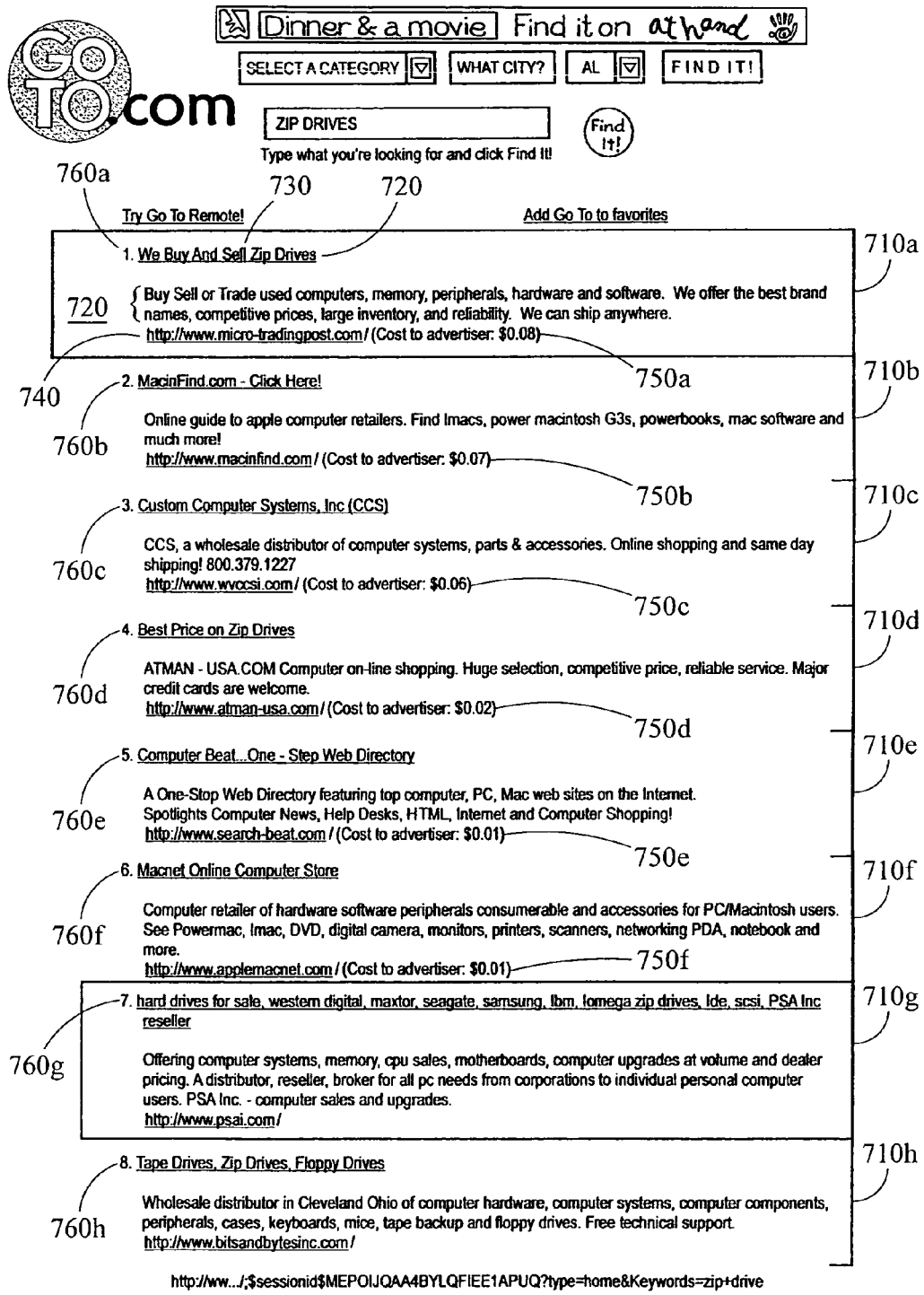
FIG. 7 illustrates an example of a search result list generated by one embodiment of the present invention.

An example of a search result list display used in one embodiment is shown in FIG. 7, which is a display of the first several entries resulting from a search for the term "zip drives". As shown in FIG. 7, a single entry, such as entry 710a in a search result list consists of a description 720 of the web site, preferably comprising a title and a short textual description, and a hyperlink 730 which, when clicked by a searcher, directs the searcher's browser to the URL where the described web site is located. The URL 740 may also be displayed in the search result list entry 710a, as shown in FIG. 7. An "impression" referral of a search result item occurs when that item is displayed to the searcher, as shown in FIG. 7. A "click through" referral of a search result item occurs when the remote searcher viewing the search result item display 710 of FIG. 7 selects, or "clicks" on the hyperlink 730 of the search result item display 710. In order for a "click through" to be completed, the searcher's click should be recorded at the account management server and redirected to the advertiser's URL via the redirect mechanism discussed above. An "action" referral of a search result item occurs, after the searcher has been redirected to the advertiser's URL, when the searcher performs the specified action associated with the advertiser's web site.

Search result list entries 710a-710h may also show the rank value of the advertiser's search listing. The rank value is an ordinal value, preferably a number, generated and assigned to the search listing by the processing system 34 of FIG. 1. Preferably, the rank value is assigned through a process, implemented in software, that establishes an association between the bid value, the rank, and the search term of a search listing. The process gathers all search listings that match a particular search term, sorts the search listings in order from highest to lowest bid value, and assigns a rank value to each search listing in order. The highest bid value receives the highest rank value, the next highest bid value receives the next highest rank value, proceeding to the lowest bid value, which receives the lowest rank value. Most preferably, the highest rank value is 1 with successively increasing ordinal values, such as 2, 3, 4 . . . assigned in order of successively decreasing rank. Under an alternative preferred embodiment, the bid values are used in combination with one or more other factors in determining rank value. As an example of other factors, certain measures of relevance that are independent of the bid value could be used. The correlation between rank value and bid value is illustrated in FIG. 7, where each of the paid search list entries 710a through 710f display the advertiser's bid value 750a through 750f for that entry. Preferably, if two search listings having the same search term also have the same bid value, the bid that was received earlier in time will be assigned the higher rank value. Unpaid listings 710g and 710h do not display a bid value and are displayed following the lowest-ranked paid listing. Preferably, unpaid listings are displayed if there are an insufficient number of listings to fill the 40 slots in a search results page. Unpaid listings are generated by a search engine utilizing objective distributed database and text searching algorithms known in the art. An example of such a search engine may be operated by Inktomi Corporation. The original search query entered by the remote searcher is used to generate unpaid listings through the conventional search engine.

Figure 8:
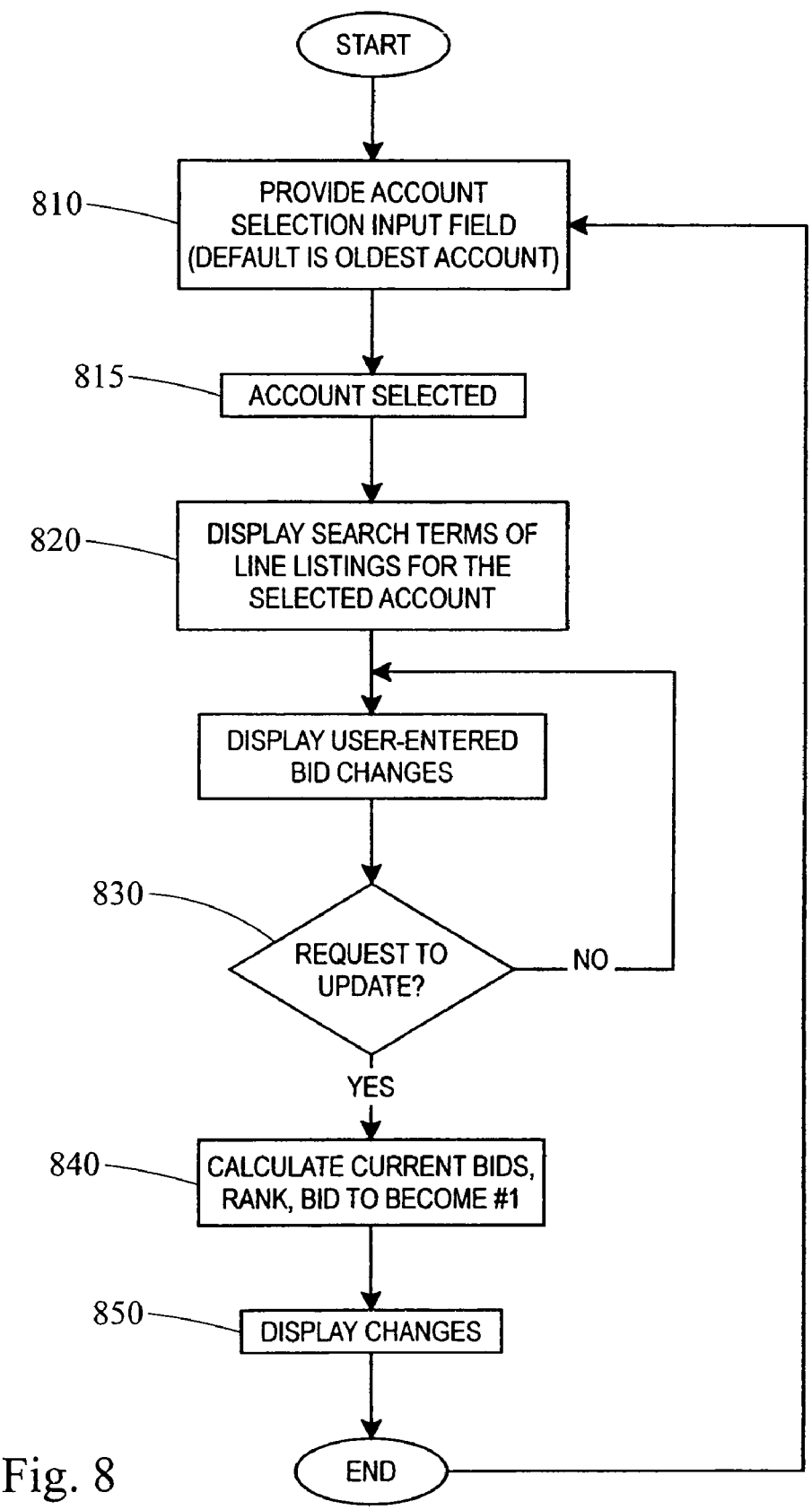
FIG. 8 is a flow chart illustrating a change bids process used in one embodiment of the present invention.

As shown in the campaign management menu 170 of FIG. 2, several choices are presented to the advertiser to manage search listings. First, in the "Change Bids" selection, the advertiser may change the bid of search listings currently in the account. The process invoked by the system for the change bids function is shown in FIG. 8. After the advertiser indicates the intent to change bids by selecting the "Change Bids" menu option, the system searches the user's account in the database and displays the search listings for the entire account or a default subaccount in the advertiser's account, as shown in step 810. Search listings may be grouped into subaccounts defined by the advertiser and may comprise one or more search listings. Only one subaccount may be displayed at a time. The display should also preferably permit the advertiser to change the subaccount selected, as shown in step 815. The screen display will then show the search listings for the selected subaccount, as indicated in step 820.

Figure 9:
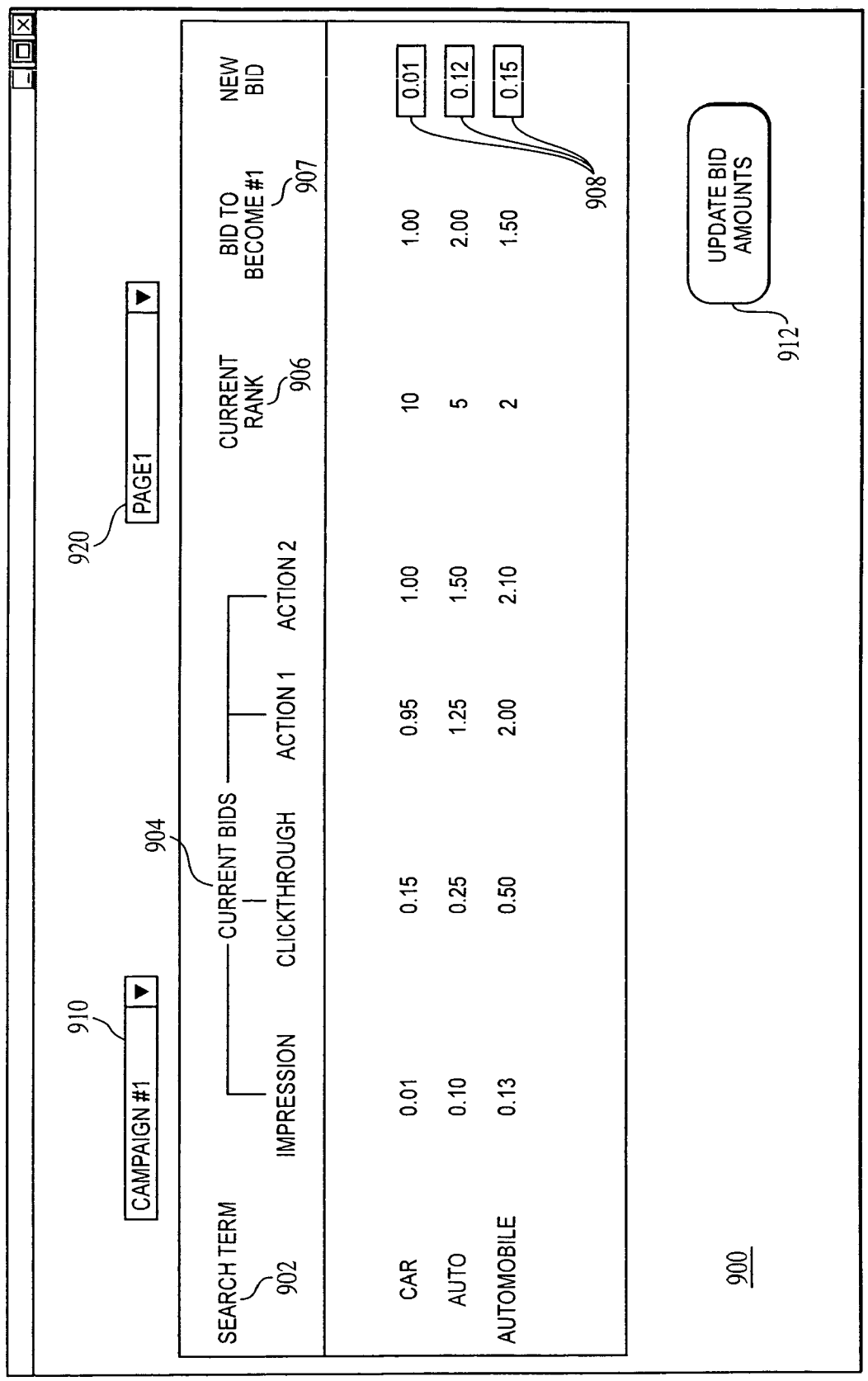
FIG. 9 illustrates an example of a screen display used in the change bids process of FIG. 8.

An example of screen display shown to the advertiser in step 810 is shown in FIG. 9 and will be discussed below. To change bids, the advertiser user may specify new bids for search terms for which the advertiser already has an existing bid by entering one or more new bid element amounts into the new bid input field for the search term. The advertiser-entered bid changes are displayed to the advertiser at step 820 of FIG. 8 as discussed above. To update the bids for the display page, the advertiser requests, at step 830 of FIG. 8, to update the result of changes. The advertiser may transmit such a request to the account management server by a variety of means, including clicking on a button graphic.

As shown in step 840 of FIG. 8, upon receiving the request to update the advertiser's bids, the system calculates the new current bid values for every search listing displayed, the rank values, and the bid value needed to become the highest ranked search listing matching the search term field. Preferably, the system then presents a display of changes at step 850. After the user confirms the changes, the system updates the persistent state by writing the changes to the account in the database.

The search listing data is displayed in tabular format, with each search listing corresponding to one row of the table 900. The search term 902 is displayed in the leftmost column, followed by the current bid value 904, and the current rank 906 of the search listing. The current rank is followed by a column entitled "Bid to become #1" 907, defined as the bid value needed to become the highest ranked search listing for the displayed search term. The rightmost column of each row comprises a new bid input field 908 which is set initially to the current bid element amounts.

As shown in FIG. 9, the search listings may be displayed as "subaccounts." Each subaccount comprises one search listing group, with multiple subaccounts residing within one advertiser account. Each subaccount may be displayed on a separate display page having a separate page. The advertiser should preferably be able to change the subaccount being displayed by manipulating a pull-down menu 910 on the display shown in FIG. 9. In addition, search listing groups that cannot be displayed completely in one page may be separated into pages which may be individually viewed by manipulating pull-down menu 920. Again, the advertiser should preferably be able to change the page displayed by clicking directly on a pull-down menu 920 located on the display page of FIG. 9. The advertiser may specify a new bid for a displayed search listing by entering a new bid element amounts into the new bid input field 908 for the search listing. To update the result of the advertiser-entered changes, the advertiser clicks on button graphic 912 to transmit an update request to the account management server, which updates the bids as described above.

Many of the other selections listed in the "Account Management" menu 170 of FIG. 2 function as variants of the "Change Bid" function described above. For example, if the advertiser selects the "Change Rank Position" option, the advertiser may be presented with a display similar to the display of FIG. 9 used in the "Change Bid" function. However, in the "Change Rank Position" option, the "New Bid" field would be replaced by a "New Rank" field, in which the advertiser enters the new desired rank position for a search term. After the advertiser requests that the ranks be updated, the system then calculates a new bid value by any of a variety of algorithms easily available to one skilled in the art. For example, the system may invoke a routine to locate the search listing in the search database having the desired rank/search term combination, retrieve the associated bid value of said combination, and then calculate a bid amount that is N cents higher; where N=1, for example. After the system calculates the new bid value and presents a read-only confirmation display to the advertiser, the system updates the bid values and rank values upon receiving approval from the advertiser.

In a second embodiment, there are multiple bid element amounts corresponding, preferably, to an impression event, a click-through event, and one or more action events. In this embodiment, the bid value is calculated as the sum of the values of each of the bid elements. In this case, the "Change Rank Position" option would work as above for the ultimate value of the bid. In addition, the system would calculate and suggest individual bid amount elements that would result in the necessary suggested bid value.

The "Modify Listing Component" selection on Account Management menu 170 of FIG. 2 may also generate a display similar to the format of FIG. 9. When the advertiser selects the "Modify Listing Component" option, the advertiser may input changes to the URL, title, or description of a search listing via web-based forms set up for each search listing. Similar to the process discussed above, the forms for the URL, title, and description fields may initially contain the old URL, title and description as default values. After the advertiser enters the desired changes, the advertiser may transmit a request to the system to update the changes. The system then displays a read-only confirmation screen, and then writes the changes to the persistent state in the user account database after the advertiser approves the changes.

A process similar to those discussed above may be implemented for changing any other peripheral options related to a search listing; for example, changing the matching options related to a bidded search term. Any recalculations of bids or ranks required by the changes may also be determined in a manner similar to the processes discussed above.

In the "Delete Bidded Search Term" option, the system retrieves all of the search listings in the account of the advertiser and displays the search listings in an organization and a format similar to the display of FIG. 9. Each search listing entry may include, instead of the new bid field, a check box for the advertiser to click on. The advertiser would then click to place a check (X) mark next to each search term to be deleted, although any other means known in the art for selecting one or more items from a list on a web page may be used. After the advertiser selects all the search listings to be deleted and requests that the system update the changes, the system preferably presents a read-only confirmation of the requested changes, and updates the advertiser's account only after the advertiser approves the changes. The "deleted" search listings are removed from the search database 36 and will not appear in subsequent searches. However, the search listing will remain as part of the advertiser's account record for billing and account activity monitoring purposes.

In the "Add Bidded Search Term" option, the system provides the advertiser with a display having a number of entry fields corresponding to the elements of a search listing. The advertiser then enters into each field information corresponding to the respective search listing element, including the search term, the web site URL, the web site title, the web site description, and the bid element amounts, as well as any other relevant information. After the advertiser has completed entering the data and has indicated thus to the system, the system returns a read-only confirmation screen to the advertiser. The system then creates a new search listing instance and writes it into the account database and the search database upon receiving approval from the advertiser.

Preferably, the "Account Management" menu 170 of FIG. 2 provides a selection for the advertiser to "Get Suggestions On Bidded Search Term". In this case, the advertiser enters a bidded search term into a form-driven query box displayed to the advertiser. The system reads the search term entered by the advertiser and generates a list of additional related search terms to assist the advertiser in locating search terms relevant to the content of the advertiser's web site. Preferably, the additional search terms are generated using methods such as a string matching algorithm applied to a database of bidded search terms and/or a thesaurus database implemented in software. The advertiser may select search terms to bid on from the list generated by the system. In that case, the system displays to the advertisers the entry fields described above for the "Add Bidded Search Term" selection, with a form for entering a search listing for each search term selected. Preferably, the selected search term is inserted as a default value into the form for each search listing. Default values for the other search listing components may also be inserted into the forms if desired.

The "Account Management" menu 170 of FIG. 2 also preferably provides advertisers with a "Project Expenses" selection. In this selection, the advertiser specifies a search listing or subaccount for which the advertiser would like to predict a "daily run rate" and "days remaining to expiration." The system calculates the projections based on a cost projection algorithm, and displays the predictions to the advertiser on a read-only screen. The predictions may be calculated using a number of different algorithms known in the art. However, since the cost of a search listing is calculated by multiplying the bid amount by the total number of clicks received by the search listing at that bid amount during a specified time period, every cost projection algorithm must generally determine an estimated number of clicks per month or other specified time period for a search listing. The clicks on a search listing may be tracked via implementation of a software counting mechanism as is well known in the art. Clicks for all search listings may be tracked over time, this data may be used to generate estimated numbers of clicks per month overall, and for individual search terms. For a particular search term, an estimated number of searches per day is determined and is multiplied by the cost of a click. This product is then multiplied by a ratio of the average number of clicks over the average number of impressions for the rank of the search listing in question to obtain a daily run rate. The current balance may be divided by the daily run rate to obtain a projected number of days to exhaustion or "expiration" of account funds.

One embodiment bases the cost projection algorithm on a simple predictor model that assumes that every search term performs in a similar fashion. This model assumes that the rank of the advertiser's search listing will remain constant and not fluctuate throughout the month. This algorithm has the advantages of being simple to implement and fast to calculate. The predictor model is based on the fact that the click through rate, e.g. the total number of clicks, or referrals, for a particular searcher listing, is considered to be a function of the rank of the search listing. The model therefore assumes that the usage curve of each search term, that is, the curve that result when the number of clicks on a search listing is plotted against the rank of the search listing, is similar to the usage curve for all search terms. Thus, known values extrapolated over time for the sum of all clicks for all search terms, the sum of all clicks at a given rank for all search terms, and the sum of all clicks for the selected search term may be employed in a simple proportion to determine the total of all clicks for the given rank for the selected search term. The estimated daily total of all clicks for the selected search term at the selected rank is then multiplied by the advertiser's current bid amount for the search term at that rank to determine a daily expense projection. In addition, if particular search terms or classes of search terms are known to differ markedly from the general pattern, correction values specific to the search term, advertiser, or other parameter may be introduced to fine-tune the projected cost estimate.

Finally, the "Account Management" menu 170 of FIG. 2 provides several selections to view information related to the advertiser's campaigns. The "View Subaccount Information" selection displays read-only information related to the selected subaccount. The "View Search Term List" selection displays the list of the advertiser's selected search terms along with the corresponding URLs, bid value, and rank, with the search terms preferably grouped by subaccount. The advertiser may also view current top bids for a set of search terms selected from a list of search terms from a read-only display generated by the system upon receiving the requested search terms from the advertiser.

For an advertiser who requires a more comprehensive report of search listing activity, the "View Report" option may be selected from the Advertiser Main Page 120 of FIG. 2. In an embodiment, the "View Report" options generate reports comprehensive for up to one year preceding the current date. For example, daily reports are available for the each of the immediately preceding 7 days, weekly reports for the preceding four weeks, monthly reports for the preceding twelve months, and quarterly reports for the last four quarters. Additional reports may also be made available depending on advertiser interest. Other predefined report types may include activity tracked during the following time periods: Since Inception of the Account, Year To Date, Yearly, Quarter To Date, Month To Date, and Week to Date. Report Categories may include a Detail Report, viewable by Advertiser Account, by Search Listing, and by URL, and a Summary Report, viewable by Advertiser Account and by Subaccount. The reports may include identification data such as advertiser account and subaccount name, the dates covered by the report and the type of report. In addition, the reports may include key search listing account data such as current balance, pending current balance, average daily account debit, and run rate. Furthermore, the reports may also include key data, such as: search terms, URLs, bids, current ranks, and number of clicks, number of searches done for the search term, number of impressions, which is the number of times that the search listing appeared in a search result list, click through rate which in one embodiment is the Number of Clicks divided by the Number of Impressions, and one or more action rates, which is defined as Number of Actions divided by the Number of Impressions. Preferably, the report is available in at least HTML view options for viewing via a browser program, printing, or downloading. Note, however, that other view options may be made available, such as Adobe Acrobat, PostScript, ASCII text, spreadsheet interchange formats (e.g., CSV, tab-delimited), and other well-known formats.

When the advertiser has selected the "View Report" option, the system invokes a function which displays a list of available report types, dates, categories, and view options. The system preferably creates a report instance with the following fields, all of which are initially set to null: report type, report date, report category, and view option. Once the advertiser has defined the parameters described above, the system invokes a function to generate the requested report, based on the advertiser-set parameters, and to display the report, based on the view option parameter.

Finally, one embodiment implements an option for context specific help that the advertiser may request at any time the advertiser is logged in. The help option may be implemented as a small icon or button located on the system generated display page. The advertiser may click on the icon or button graphic on the display page to request help, upon which the system generates and displays a help page keyed to the function of the particular display the user is viewing. The help may be implemented as separate display pages, a searchable index, dialog boxes, or by any other methods well known in the art.

The foregoing detailed description should be regarded as illustrative rather than limiting and the appended claims, including all equivalents, are intended to define the scope of the invention.

The invention claimed is:

1. A method of operating a search system, the method comprising:
    maintaining a database of search listings searchable by a search engine, each search listing being associated with a search term and a bid amount, the bid amount corresponding to a money amount chargeable a search listing is referred by the search engine;
    receiving a search request from a searcher;
    identifying search listings generating a match with the search request; and
    ordering the identified search listings into a search result list in accordance with values of respective bid amounts for the identified search listings, wherein the values of the respective bid amounts are based on:
        (a) a bid element amount for impression;
        (b) a value of a bid element amount for clickthrough, calculated based on the bid element amount and probability of a clickthrough event; and
        (c) a bid element amount for actions;
    receiving none, one or more of the following:
        a retrieval request from the searcher to retrieve information associated with a selected search listing in the search result list, and
        one or more notifications that the searcher has performed one or more respective actions in connection with the selected search listing;
    debiting an account of the web site promoter associated with the selected search listing and the respective bid as follows:
        by the bid element amount for impression,
        by the bid element amount for clickthrough, provided a clickthrough request was received, and
        by the bid element amounts for, respectively, one or more actions, provided notifications were received for said one or more actions.

2. The method of claim 1 wherein the probability is calculated as a ratio of an estimated number of times the clickthrough events will occur to an estimated number of times the clickthrough events could occur within a specified time period.

3. The method of claim 1 further comprising:
    calculating a numerator as a ratio of an estimated number of times the clickthrough events will occur to an estimated number of times the clickthrough events could occur within a specified time period;
    calculating a denominator representing the standard clickthrough rate for listings of the average ranking, over the same specified period of time, of the identified search listing corresponding to the bid; and
    calculating the probability as the ratio of the numerator to the denominator.

4. A method of operating a pay for placement web site, the method comprising:
    maintaining a database searchable by a search engine, the database including a plurality of search listings, each search listing being associated with an Internet website, a search term and a bid amount, the bid amount corresponding to a money amount chargeable to a web site promoter each time the web site promoter's web site is referred by the search engine, the bid amount including at least one of a bid element amount for impression, a bid element amount for a clickthrough and a bid element amount for an action;
    receiving a search request from a searcher;
    identifying search listings generating a match with the search request; and
    returning a search list including the identified search listings, including,
    ordering the identified search listings into the search result list in accordance with values of respective bid amounts for the identified search listings, the values of the respective bid amounts being calculated based on:
        bid element amounts for impressions;
        bid element amounts for clickthroughs; and
        bid element amounts for actions,
    wherein the value of a bid element amount for an action is calculated using the bid element amount and a probability associated with the action event, and wherein the probability is calculated using an estimated number of times the action events will occur and an estimated number of times the action events could occur within a specified time period.

5. The method of claim 4 further comprising:
    receiving none, one or more of the following:
        a retrieval request to retrieve information associated with a selected search listing in the search result list, and
        one or more notifications that the searcher has performed one or more respective actions in connection with the selected search listing;
    debiting an account of the web site promoter associated with the selected search listing and the respective bid as follows:
        by the bid element amount for impression,
        by the bid element amount for clickthrough, provided a clickthrough request was received, and
        by the bid element amounts for, respectively, one or more actions, provided notifications were received for said one or more actions.

6. A database search system comprising:
    a database which stores a plurality of search listings, each search listing being associated with a bid amount and a search term, the bid amount including a market value corresponding to a money amount chargeable to an account of an advertiser associated with the search listing;
    a computer system which determines the market values of the respective bids by determining a product of a bid received from a respective advertiser and a probability that one or more bid events will occur, the one or more bid events including a click-through, including
        program code which calculates a numerator as a ratio of an estimated number of times the one or more bid events will occur to an estimated number of times the one or more bid events could occur within a specified time period,
        program code which calculates a denominator representing the standard click-through rate for listings of the average ranking, over the same specified period of time, of the identified search listing corresponding to the bid, and program code which calculates the probability as the ratio of the numerator to the denominator;

a server system which receives a search request from the searcher;

a search engine operative in conjunction with the database to identify search listings having search terms generating a match with the received search request, the server system configured to
order the identified search listings in a search result list according to values of the respective bid amounts of the identified search listings;
detect a clickthrough by the searcher of one of the ordered search listings; and
in response to the clickthrough, charge the account of the advertiser associated with the one search listing by the bid amount.

* * * * *